(12) United States Patent
Yonemaru et al.

(10) Patent No.: US 12,331,898 B2
(45) Date of Patent: Jun. 17, 2025

(54) VEHICLE LIGHT, ILLUMINATION DEVICE FOR ACTIVE SENSOR, AND GATING CAMERA

(71) Applicant: KOITO MANUFACTURING CO., LTD., Tokyo (JP)

(72) Inventors: Shota Yonemaru, Shizuoka (JP); Kazuya Motohashi, Shizuoka (JP); Tomoaki Harada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 83 days.

(21) Appl. No.: 18/016,192

(22) PCT Filed: Jul. 6, 2021

(86) PCT No.: PCT/JP2021/025501
§ 371 (c)(1),
(2) Date: Jan. 13, 2023

(87) PCT Pub. No.: WO2022/014417
PCT Pub. Date: Jan. 20, 2022

(65) Prior Publication Data
US 2023/0272895 A1    Aug. 31, 2023

(51) Int. Cl.
*F21S 41/24* (2018.01)
*B60Q 1/00* (2006.01)
(Continued)

(52) U.S. Cl.
CPC ............ *F21S 41/24* (2018.01); *B60Q 1/0023* (2013.01); *F21S 41/13* (2018.01); *F21S 41/16* (2018.01);
(Continued)

(58) Field of Classification Search
CPC .. F21S 41/24; F21S 41/16; F21S 41/27; F21S 41/13; H04N 23/73; H04N 23/74; H04N 23/72; B60Q 1/0023
See application file for complete search history.

(56) References Cited

U.S. PATENT DOCUMENTS 7,775,697 B2 *   8/2010   Hirano .................. F21S 43/245
                                                                362/540
8,882,316 B2 *   11/2014  Natsume ................ F21S 43/20
                                                                362/520
(Continued)

FOREIGN PATENT DOCUMENTS

EP       3 674 138 A1      7/2020
JP       2009-257983 A     11/2009
(Continued)

OTHER PUBLICATIONS

International Search Report (PCT/ISA/210) dated Sep. 14, 2021, issued by the International Searching Authority in counterpart International Application No. PCT/JP2021/025501.
(Continued)

*Primary Examiner* — Bryon T Gyllstrom
(74) *Attorney, Agent, or Firm* — Sughrue Mion, PLLC

(57) ABSTRACT

A vehicle lamp includes a clearance lamp and an illumination unit for an active sensor. The illumination unit includes a near-infrared light source and a photoconductor. The photoconductor receives emitted light from the near-infrared light source and emits illumination light having a predetermined light distribution from an emission surface. The photoconductor is disposed such that a rear surface thereof faces a light emitting surface of the clearance lamp, and emits, from the emission surface, emitted light from the clearance lamp which is received at the rear surface.

4 Claims, 21 Drawing Sheets

(51) Int. Cl.
*F21S 41/13* (2018.01)
*F21S 41/16* (2018.01)
*F21S 41/27* (2018.01)
*F21W 103/10* (2018.01)
*H04N 23/72* (2023.01)
*H04N 23/73* (2023.01)
*H04N 23/74* (2023.01)

(52) U.S. Cl.
CPC .............. *F21S 41/27* (2018.01); *H04N 23/72* (2023.01); *H04N 23/73* (2023.01); *H04N 23/74* (2023.01); *F21W 2103/10* (2018.01)

(56) References Cited

U.S. PATENT DOCUMENTS

| | | | | |
|---|---|---|---|---|
| 9,366,412 | B2* | 6/2016 | Kim | F21S 43/245 |
| 2004/0130904 | A1* | 7/2004 | Yamada | B60Q 1/2607 |
| | | | | 362/487 |
| 2004/0136203 | A1* | 7/2004 | Gasquet | F21S 43/249 |
| | | | | 362/543 |
| 2006/0232395 | A1* | 10/2006 | Tatsukawa | F21S 41/13 |
| | | | | 340/468 |
| 2009/0284365 | A1 | 11/2009 | Wagner et al. | |
| 2010/0008088 | A1* | 1/2010 | Koizumi | F21S 43/14 |
| | | | | 362/235 |
| 2013/0258689 | A1 | 10/2013 | Takahira et al. | |
| 2015/0334316 | A1* | 11/2015 | Wang | H04N 23/51 |
| | | | | 348/143 |
| 2016/0040847 | A1 | 2/2016 | Ikuta et al. | |
| 2016/0259116 | A1* | 9/2016 | Van Bommel | F21S 41/151 |
| 2017/0219179 | A1* | 8/2017 | Hirata | F21S 43/245 |
| 2018/0264995 | A1 | 9/2018 | Inoue et al. | |
| 2019/0003673 | A1 | 1/2019 | Hirata et al. | |
| 2019/0004149 | A1 | 1/2019 | Mano et al. | |
| 2020/0174100 | A1* | 6/2020 | Hori | B60Q 1/0023 |
| 2020/0200356 | A1* | 6/2020 | Potter | F21S 41/143 |
| 2021/0341123 | A1 | 11/2021 | Mototsuji | |

FOREIGN PATENT DOCUMENTS

| | | |
|---|---|---|
| JP | 2014-17094 A | 1/2014 |
| JP | 2014-157804 A | 8/2014 |
| JP | 2014-222638 A | 11/2014 |
| JP | 2018-150029 A | 9/2018 |
| JP | 2020-61233 A | 4/2020 |
| JP | 2020-107595 A | 7/2020 |
| WO | 2016/051491 A1 | 4/2016 |
| WO | 2017/110413 A1 | 6/2017 |
| WO | 2019/021693 A1 | 1/2019 |
| WO | 2019/194218 A1 | 10/2019 |

OTHER PUBLICATIONS

Written Opinion (PCT/ISA/237) dated Sep. 14, 2021, issued by the International Searching Authority in counterpart International Application No. PCT/JP2021/025501.
Communication issued on Jan. 14, 2025 from the Japan Patent Office for Japanese Patent Application No. 2022-536282.

* cited by examiner

FIG. 10A
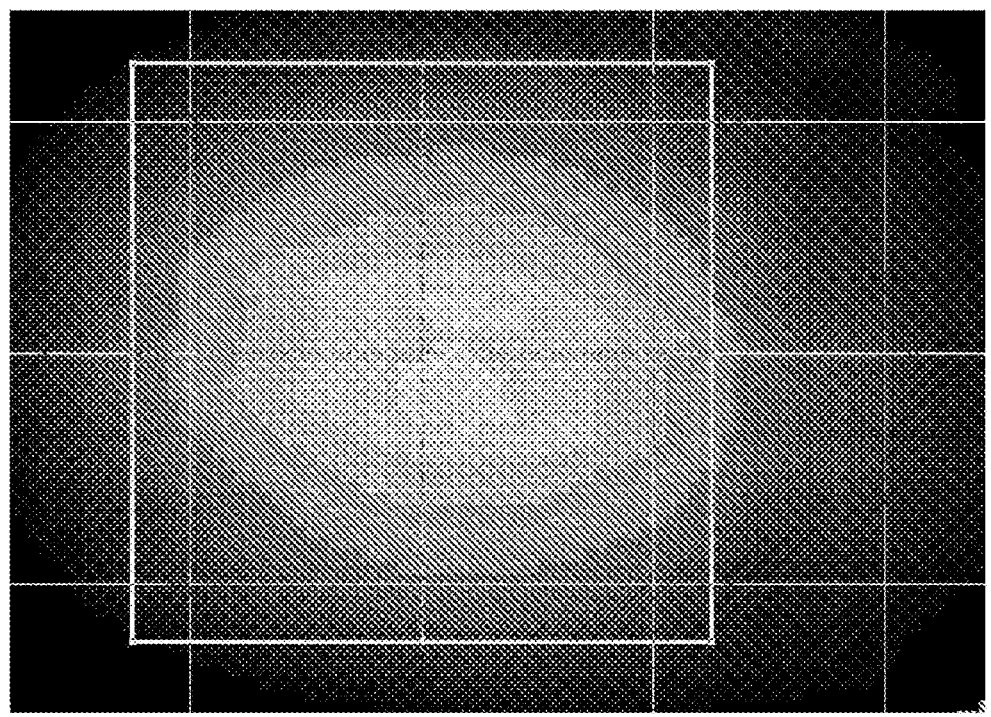
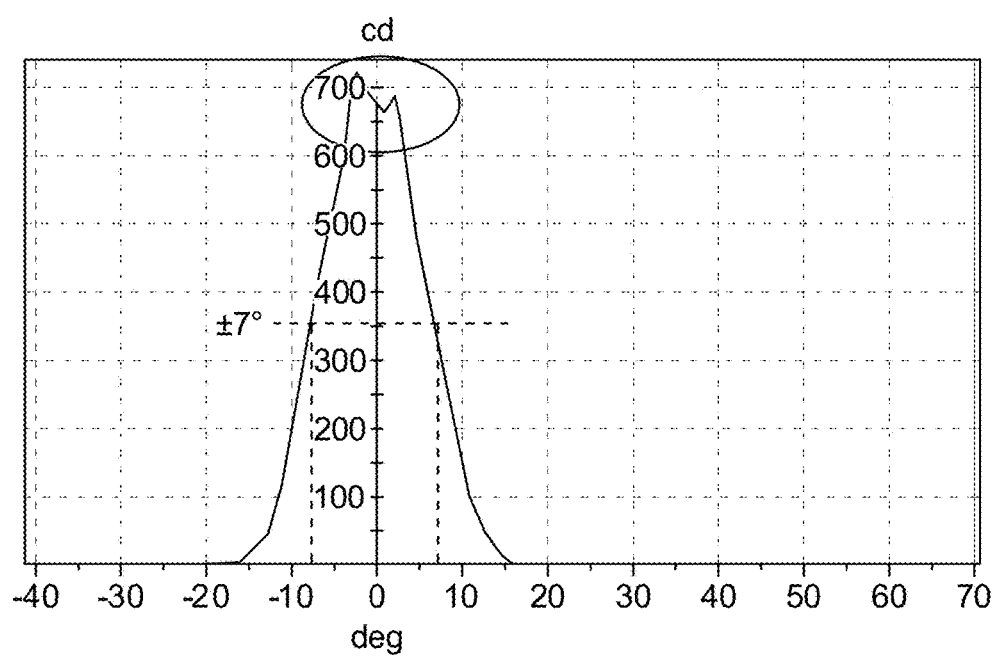
FIG. 10B

FIG. 13A
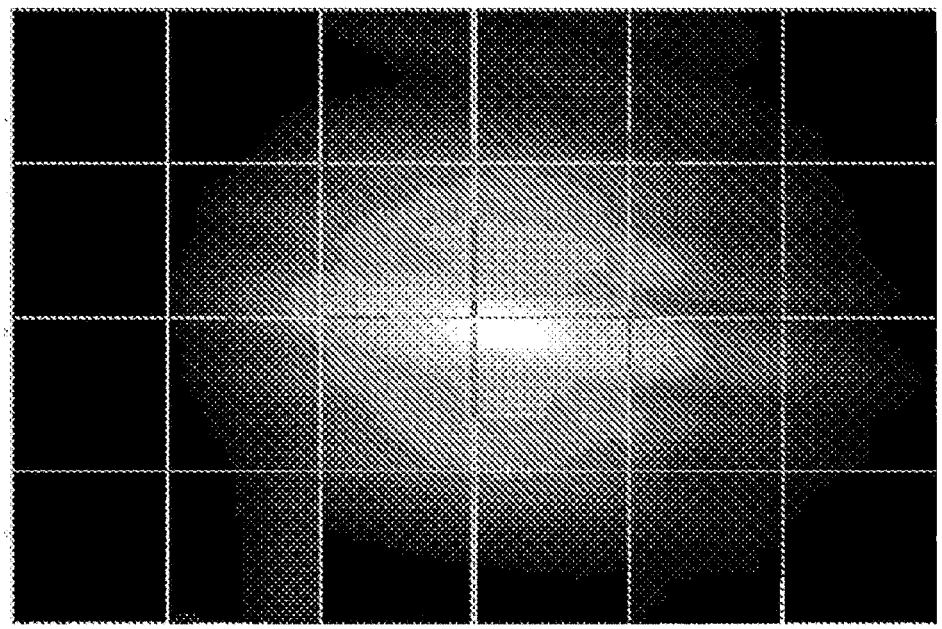
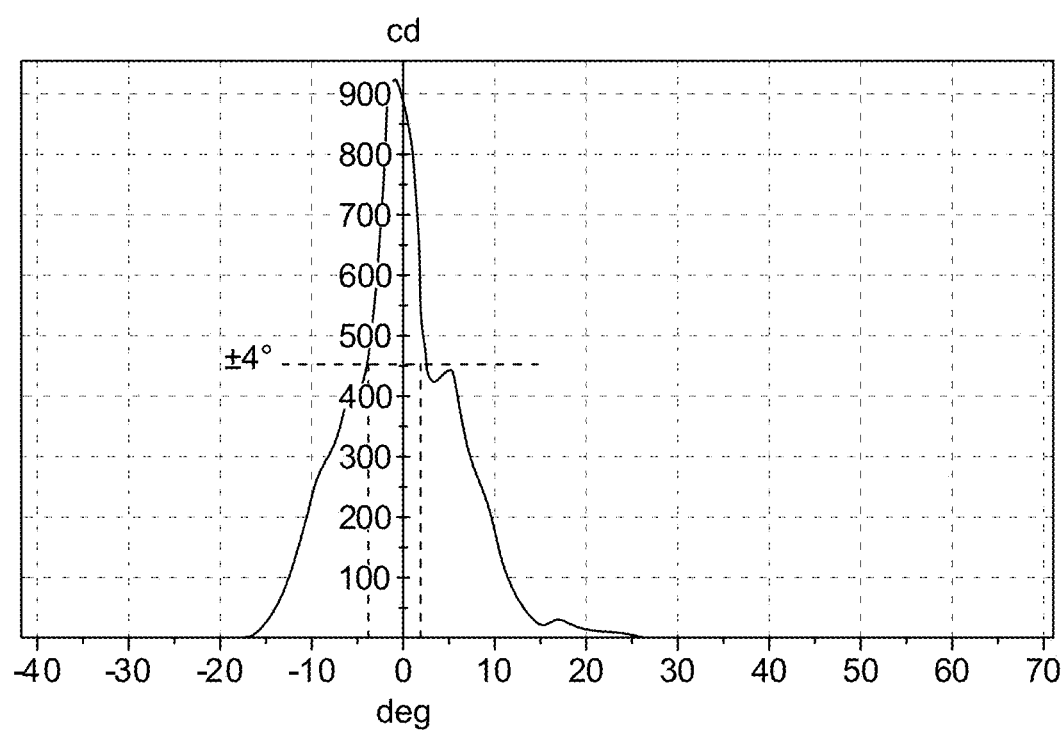
FIG. 13B

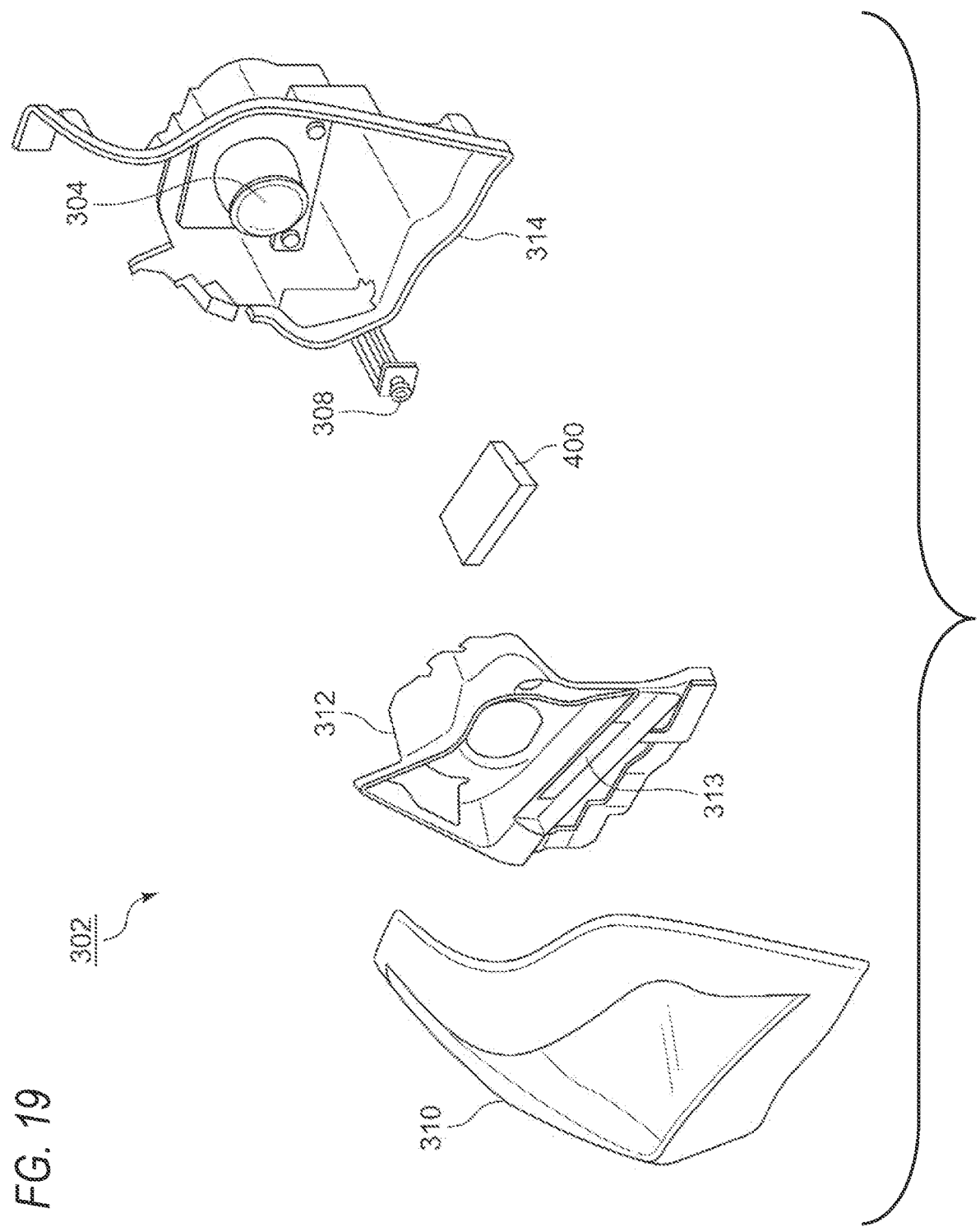

VEHICLE LIGHT, ILLUMINATION DEVICE FOR ACTIVE SENSOR, AND GATING CAMERA

CROSS-REFERENCE TO RELATED APPLICATIONS

This application is a National Phase Entry of PCT International Application No. PCT/JP2021/025501 filed on Jul. 6, 2021, which claims priority to Japanese Patent Application No. 2020-121634 filed on Jul. 15, 2020, Japanese Patent Application No. 2020-121635 filed on Jul. 15, 2020, and Japanese Patent Application No. 2020-121636 filed on Jul. 15, 2020, the contents of all of which are incorporated herein by reference in their entirety.

TECHNICAL FIELD

The present invention relates to an active sensor.

BACKGROUND ART

For automated driving and autonomous control on a light distribution of a headlamp, an object identification system that senses a position and a type of an object present around a vehicle is used. The object identification system includes a sensor and an arithmetic processing device that analyzes an output from the sensor. The sensor is selected from a camera, light detection and ranging or laser imaging detection and ranging (LiDAR), a millimeter wave radar, an ultrasonic sonar, an active sensor, and the like in consideration of use, required accuracy, and cost.

Depth information cannot be obtained from a general monocular camera. Therefore, when a plurality of objects located at different distances overlap one another, it is difficult to separate the objects from one another.

As the camera from which the depth information is obtained, a TOF camera is known. The time of flight (TOF) camera projects infrared light by a light emitting device, measures a flight time until reflected light returns to an image sensor, and obtains a TOF image in which the flight time is converted into distance information.

As an active sensor that replaces the TOF camera, a gating camera (or a gated camera) has been proposed (Patent Literatures 1 and 2). The gating camera divides an imaging range into a plurality of ranges, and performs imaging by changing an exposure timing and an exposure time for each range. As a result, a slice image is obtained for each target range, and each slice image includes only an object included in the corresponding range.

CITATION LIST

Patent Literature

Patent Literature 1: JP2009-257983A
Patent Literature 2: WO2017/110413A1

SUMMARY OF INVENTION

Technical Problem

1. As an illumination device of an active sensor, when near-infrared light is used, part of a spectrum thereof is visually recognized as as red by eyes of a human, and thus installing the near-infrared light in a headlamp without taking measures against the part of the spectrum violates regulations.

An aspect of the present disclosure has been made in such a situation, and one of exemplary objects is to provide a vehicle lamp that satisfies the regulation.

2. The inventors of the present invention consider incorporating an illumination device of an active sensor into a vehicle lamp.

The vehicle lamp includes existing low beams, high beams, and position lamps (clearance lamps), and direction indicators. The illumination device for the active sensor requires a light distribution that covers a field of view of an image sensor of the active sensor, and also needs to be disposed so as not to impair functions of the existing lamps, and is subject to size and shape restrictions.

An aspect of the present disclosure has been made in such a situation, and one of exemplary objects is to provide a vehicle lamp with a built-in illumination device for an active sensor.

When a laser diode is used as an illumination device of an active sensor, it is necessary to satisfy laser safety standards while forming an appropriate light distribution in the field of view.

An aspect of the present disclosure has been made in such a situation, and one of exemplary objects is to provide an illumination device that can satisfy both an appropriate light distribution and laser safety standards.

Solution to Problem

1. A vehicle lamp according to an aspect of the present disclosure includes a white lamp and an illumination device for an active sensor. The illumination device includes a near-infrared light source; and a photoconductor configured to receive emitted light from the near-infrared light source and emit illumination light having a predetermined light distribution from an emission surface. The photoconductor is disposed such that a rear surface thereof faces a light emitting surface of the white lamp, and emits, from the emission surface, emitted light from the white lamp which is received at the rear surface.

2. A vehicle lamp according to an aspect of the present disclosure includes an illumination device for an active sensor. The illumination device includes a semiconductor light source configured to emit an infrared light beam; and a photoconductor configured to receive the infrared light beam on a light entrance surface and emit illumination light having a predetermined light distribution from an emission surface.

3. An illumination device for an active sensor according to an aspect of the present disclosure includes: a plurality of laser diodes, a plurality of condensing lenses; a plurality of condensing lenses, each provided on an optical path of one corresponding emitted beam of the plurality of laser diodes, and configured to make the emitted beam close to parallel light; and a fly-eye lens configured to diffuse the emitted light from the plurality of condensing lenses.

Advantageous Effects of Invention

According to the aspect of the present disclosure, regulations can be satisfied. According to the aspect of the present disclosure, a vehicle lamp with a built-in illumination device for an active sensor can be provided. According to the aspect of the present disclosure, both an appropriate light distribution and laser safety standards can be satisfied.

BRIEF DESCRIPTION OF DRAWINGS

FIGS. 10A and 10B are diagrams showing simulation results of a light distribution pattern of the illumination unit according to the first embodiment.

FIGS. 13A and 13B are diagrams showing a simulation result of a light distribution pattern when using the photoconductor according to the first modification.

FIG. 19 is an exploded perspective view of a headlamp according to a second embodiment.

DESCRIPTION OF EMBODIMENTS

Figure 1:
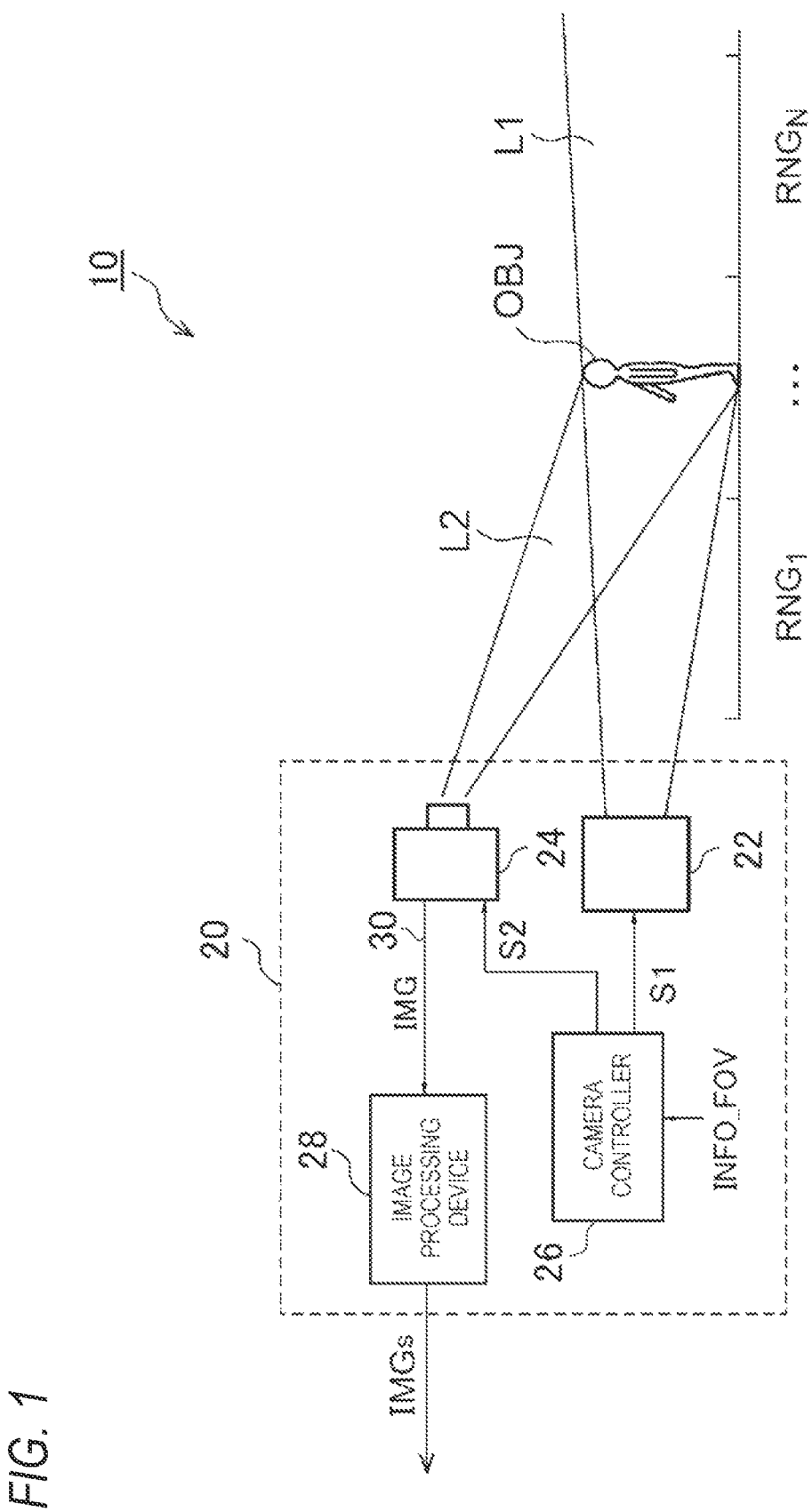
FIG. 1 is a block diagram of a sensing system according to a first embodiment.

An overview of some exemplary embodiments of the present disclosure will be described. As an introduction of the detailed description to be described later, this overview is intended to simplify and describe some concepts of one or more embodiments for the purpose of basic understanding of the embodiments, and is not intended to limit the scope of the invention or disclosure. This overview is not a comprehensive overview of all conceivable embodiments, and does not intend to specify an important element of all embodiments or to draw a range of a part or all of aspects. For convenience, "an embodiment" may be used to refer to one embodiment (example or modification) or a plurality of embodiments (examples or modifications) disclosed in the present description.

1. A vehicle lamp according to an embodiment includes a white lamp and an illumination device for an active sensor. The illumination device includes a near-infrared light source; and a photoconductor configured to receive emitted light from the near-infrared light source and emit illumination light having a predetermined light distribution from an emission surface. The photoconductor is disposed such that a rear surface thereof faces a light emitting surface of the white lamp, and emits, from the emission surface, emitted light from the white lamp which is received at the rear surface.

According to such a configuration, the near-infrared light is superimposed on white light and emitted, and thus the light can be prevented from being visually recognized as red, and regulations can be satisfied.

In the embodiment, the white lamp may be a clearance lamp. The clearance lamp plays an important role in impressing a design of the headlamp, and by overlapping the clearance lamp and a member for an active sensor, an illumination function of the active sensor can be added without impairing a design of the headlamp.

In the embodiment, the rear surface of the photoconductor may be provided with a plurality of steps spaced apart in an optical axis direction of the near-infrared light source.

In the embodiment, the white lamp may include a white light source and a photoconductor configured to guide white light of the white light source. The white light source and the near-infrared light source may be mounted on the same board. As a result, the white light source, the near-infrared light source, and drive circuits thereof can be integrated in one place in the headlamp.

In the embodiment, the illumination device and the white lamp may be modularized.

2. A vehicle lamp according to an embodiment includes an illumination device for an active sensor. The illumination device includes: a semiconductor light source configured to emit an infrared light beam; and a photoconductor configured to receive the infrared light beam on a light entrance surface and emit illumination light having a predetermined light distribution from an emission surface.

The photoconductor is used, so that when a case where a lens optical system or a reflective optical system is used is compared, a degree of freedom in a shape and a size of the illumination device is increased, and it becomes possible to accommodate the illumination device in a housing of the headlamp without impairing functions of existing lamps.

When white light is transmitted through the photoconductor, the photoconductor itself glows white and is visually recognized due to internal reflection and diffusion. Therefore, in the related art, the photoconductor is sometimes used in a lamp intended to be visible from the outside, such as a clearance lamp, but the photoconductor is difficult to be employed in a lamp intended to irradiate an object, such as a low beam and a high beam. In this regard, by setting illumination light for the active sensor as the infrared light, even if the photoconductor is employed in an optical system for forming an illumination light distribution, the light will not be visually recognized as white light.

In the embodiment, a rear surface of the photoconductor may be provided with a plurality of steps (reflection patterns) spaced apart in an optical axis direction of the semiconductor light source. By using reflection due to the plurality of steps, a spread illumination light distribution in a horizontal direction can be formed in front of a vehicle, and an entire field of view in the horizontal direction of an image sensor can be covered.

In the embodiment, the emission surface of the photoconductor may have a curvature in a vertical direction. Accordingly, the light distribution in the vertical direction of the illumination light emitted from the emission surface of the photoconductor can be controlled according to the curvature.

In the embodiment, a sagittal plane of the photoconductor may taper inversely toward the front of the vehicle. When the infrared light beam is reflected at a top surface and a bottom surface of the photoconductor, a luminous intensity distribution of the light distribution has a plurality of peaks in the vertical direction, but by providing the reverse taper, the reflection on the top surface and the bottom surface of the photoconductor can be prevented, and the plurality of peaks can be prevented.

In the embodiment, an absorber attached to at least one of the top surface and the bottom surface of the photoconductor and configured to absorb the infrared light beam may be further provided. Accordingly, reflected light from the top surface and the bottom surface of the photoconductor can be reduced, and occurrence of the plurality of peaks can be prevented.

In the embodiment, the light entrance surface of the photoconductor may have a curvature in a horizontal direction. By designing the curvature such that the infrared light beam inside the photoconductor approaches parallel light (collimated light), it is possible to prevent the infrared light beam from being totally reflected on the emission surface of the photoconductor. Alternatively, the light distribution in the horizontal direction of the illumination light emitted from the emission surface of the photoconductor can be controlled according to the curvature of the light entrance surface.

In the embodiment, the semiconductor light source may be disposed in the vehicle lamp and outside a vehicle with an optical axis of the semiconductor light source directed toward a center of the vehicle.

In the embodiment, the semiconductor light source may be disposed in the vehicle lamp and at a center of a vehicle with an optical axis of the semiconductor light source directed outward the vehicle.

In the embodiment, the vehicle lamp may further include the illumination device and an image sensor constituting a gating camera.

3. An illumination device for an active sensor according to an embodiment includes: a plurality of laser diodes; a plurality of condensing lenses, each provided on an optical path of one corresponding emitted beam of the plurality of laser diodes, and configured to make the emitted beam close to parallel light; and a fly-eye lens configured to diffuse the emitted light from the plurality of condensing lenses.

According to this configuration, by combining the condensing lenses and the fly-eye lens, it is possible to form an appropriate light distribution and locally eliminate a portion whose luminance is high within the light emitting surface, thereby satisfying laser safety standards.

In the embodiment, the plurality of laser diodes may be arranged side by side in the horizontal direction.

In the embodiment, each of the plurality of condensing lenses may have different powers in a horizontal direction and a vertical direction.

In the embodiment, the plurality of condensing lenses may be integrally formed. Accordingly, assembly becomes easier.

Hereinafter, preferred embodiments will be described with reference to the drawings. The same or equivalent components, members, and processing shown in the drawings are denoted by the same reference numerals, and repeated descriptions thereof will be omitted as appropriate. The embodiments are not intended to limit the scope of the present disclosure and invention and are merely used for description, and all features described in the embodiments and combinations thereof are not necessarily essential features of the present disclosure and invention.

First Embodiment

FIG. 1 is a block diagram of a sensing system 10 according to a first embodiment. The sensing system 10 is mounted on a vehicle such as an automobile or a motorcycle, and detects an object OBJ present around the vehicle.

The sensing system 10 mainly includes a gating camera 20. The gating camera 20 includes an illumination device 22, an image sensor 24, a camera controller 26, and an image processing device 28. Imaging performed by the gating camera 20 is performed by dividing a field of view into a plurality of N (N≥2) ranges $RNG_1$ to $RNG_N$ in a depth direction. Adjacent ranges may overlap each other in the depth direction at boundaries of the ranges.

The illumination device (light projector) 22 irradiates a front of the vehicle with illumination light L1 in synchronization with a light emission timing signal S1 supplied from the camera controller 26. In the present embodiment, the illumination light L1 is near-infrared light or mid-infrared light.

The image sensor 24 includes a plurality of pixels, can perform exposure control in synchronization with an exposure timing signal S2 supplied from the camera controller 26, and generates a slice image IMG including the plurality of pixels. The image sensor 24 has a sensitivity to the same wavelength as that of the illumination light L1, and images reflected light (return light) L2 reflected by the object OBJ. The slice image IMG generated by the image sensor 24 with respect to an i-th range $RNG_i$ is referred to as a raw image or a primary image as necessary, and is distinguished from a slice image IMGs which is a final output from the gating camera 20.

The camera controller 26 changes the light emission timing signal S1 and the exposure timing signal S2 for each range RIG to change a time difference between light emission performed by the illumination device 22 and exposure of the image sensor 24. The light emission timing signal S1 defines a timing of starting the light emission and a light emission time. The exposure timing signal S2 defines a timing of starting exposure (a time difference from the light emission) and an exposure time.

The gating camera 20 generates a plurality of slice images $IMG_1$ to $IMG_N$ corresponding to the plurality of ranges $RNG_1$ to $RNG_N$. Only an object included in the corresponding range $RNG_i$ appears in the i-th slice image $IMG_i$.

The image processing device 28 can be implemented by a combination of a processor (hardware) such as a central processing unit (CPU), a micro processing unit (MPU), a microcomputer, or a graphics processing unit (GPU), and a software program executed by the processor (hardware). The image processing device 28 may be implemented by only hardware. The image processing device 28 processes the image generated by the image sensor 24 and outputs a final slice image. When an output from the image sensor 24 is directly used as the slice image, the image processing device 28 can be omitted.

Figure 2:
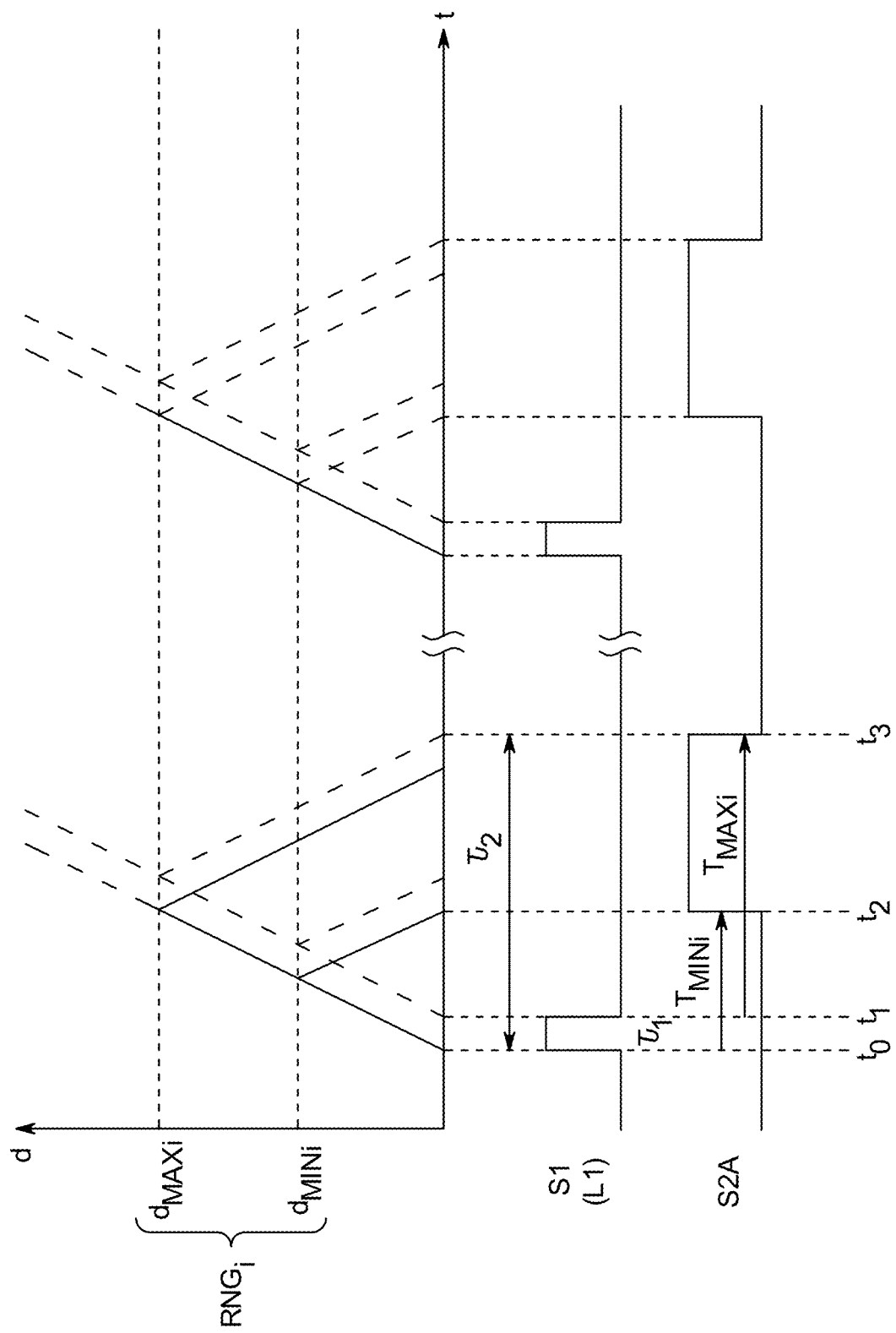
FIG. 2 is a diagram illustrating an operation of a gating camera.

FIG. 2 is a diagram illustrating an operation of the gating camera 20. FIG. 2 shows a state where the i-th range $RNG_i$ is sensed as a range of interest (ROI). The illumination device 22 emits light during a light emission period $\tau_1$ between time points $t_0$ and $t_1$ in synchronization with the light emission timing signal S1. An uppermost stage shows a diagram of light beams in which a horizontal axis represents a time and a vertical axis represents a distance. A distance from the gating camera 20 to a near side boundary of the range $RNG_i$ is set as $d_{MINi}$, and a distance from the gating camera 20 to a far side boundary of the range $RNG_i$ is set as $d_{MAXi}$.

A round trip time $T_{MINi}$ until light emitted from the illumination device 22 at a time point reaches the distance $d_{MINi}$ and then the reflected light of the light returns to the image sensor 24 is $T_{MINi} = 2 \times d_{MINi}/c$. c is the speed of light.

Similarly, a round trip time $T_{MAXi}$ until light emitted from the illumination device 22 at a time point reaches the distance $d_{MAXi}$ and then reflected light of the light returns to the image sensor 24 is $T_{MAXi} = 2 \times d_{MAXi}/c$.

When it is desired to image only the object OBJ included in the range $RNG_i$, the camera controller 26 generates the exposure timing signal S2 such that the exposure is started at a time point $t_2 = t_0 + T_{MINi}$ and the exposure is ended at a time point $t_3 = t_1 + T_{MAXi}$. This is one exposure operation.

When the i-th range $RNG_i$ is imaged, a plurality of sets of light emission and exposure may be performed. In this case, the camera controller 26 may repeat a set of the above irradiation and exposure operations a plurality of times during a predetermined period $\tau_2$. The image sensor 24 outputs slice images integrated by performing the exposure a plurality of times.

In the present embodiment, the gating camera 20 optimizes a shutter speed (exposure time), the number of times of exposure, sensitivity, an irradiation intensity of the illumination light, and the like (imaging parameters) for each range such that variation in the exposure (a luminance value of an object image in a slice image) for each range does not occur.

Figures 3A, 3B:
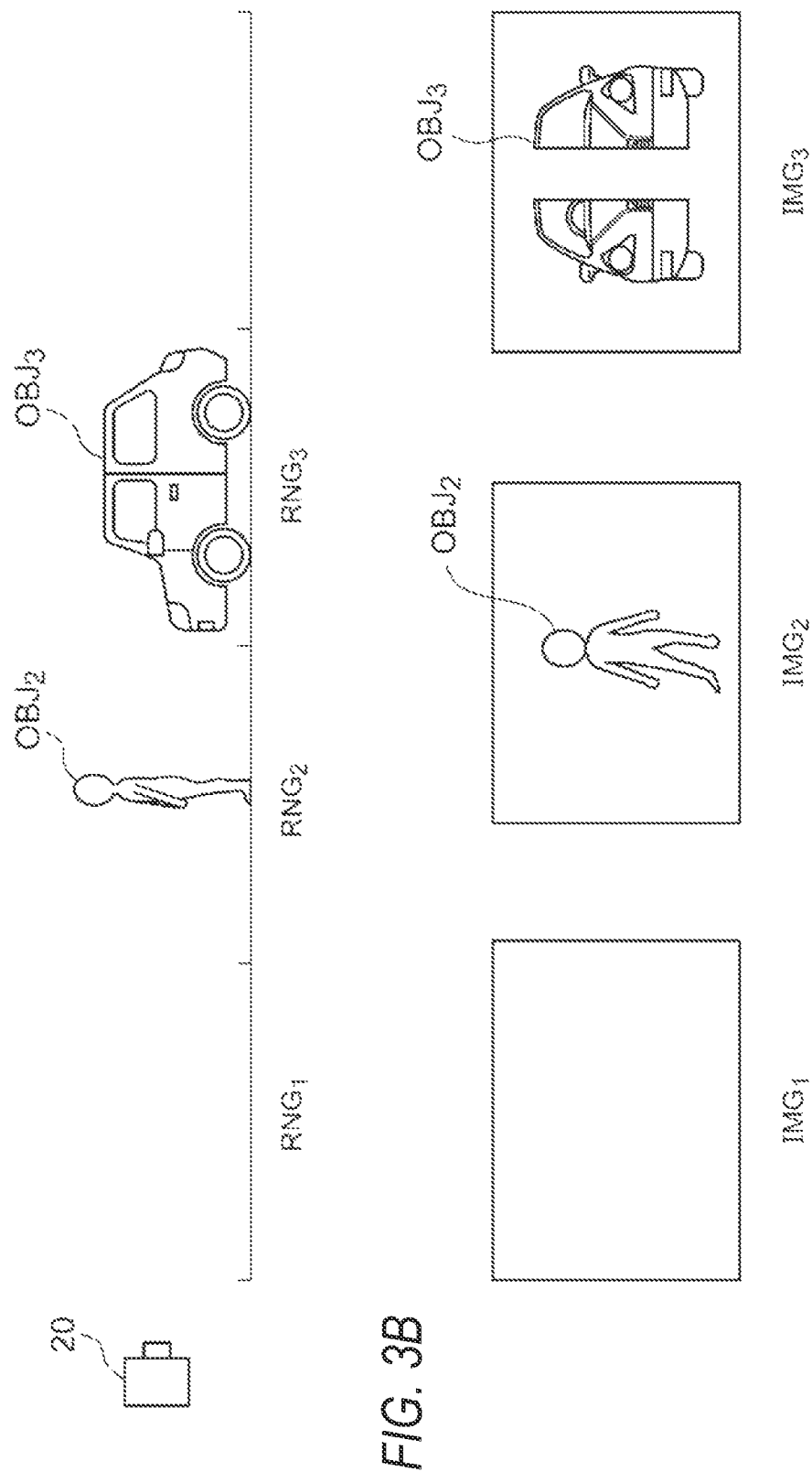
FIGS. 3A and 3B are diagrams illustrating images obtained by the gating camera.

FIGS. 3A and 3B are diagrams illustrating images obtained by the gating camera 20. In an example of FIG. 3A, an object (pedestrian) $OBJ_2$ is present in a range $RNG_2$, and an object (vehicle) $OBJ_3$ is present in a range $RNG_3$. FIG. 3B shows a plurality of slice images $IMG_1$ to $IMG_3$ obtained in a situation in FIG. 3A. When the slice image $IMG_1$ is captured, since the image sensor is exposed merely by the reflected light from the range $RNG_1$, no object image appears in the slice image $IMG_1$.

When the slice image $IMG_2$ is captured, since the image sensor is exposed merely by the reflected light from the range $RNG_2$, only the object image $OBJ_2$ appears in the slice image $IMG_2$. Similarly, when the slice image $IMG_3$ is captured, since the image sensor is exposed merely by the reflected light from the range $RNG_3$, only the object image $OBJ_3$ appears in the slice image $IMG_3$. As described above, according to the gating camera 20, it is possible to separately image an object for each range.

Figure 4:
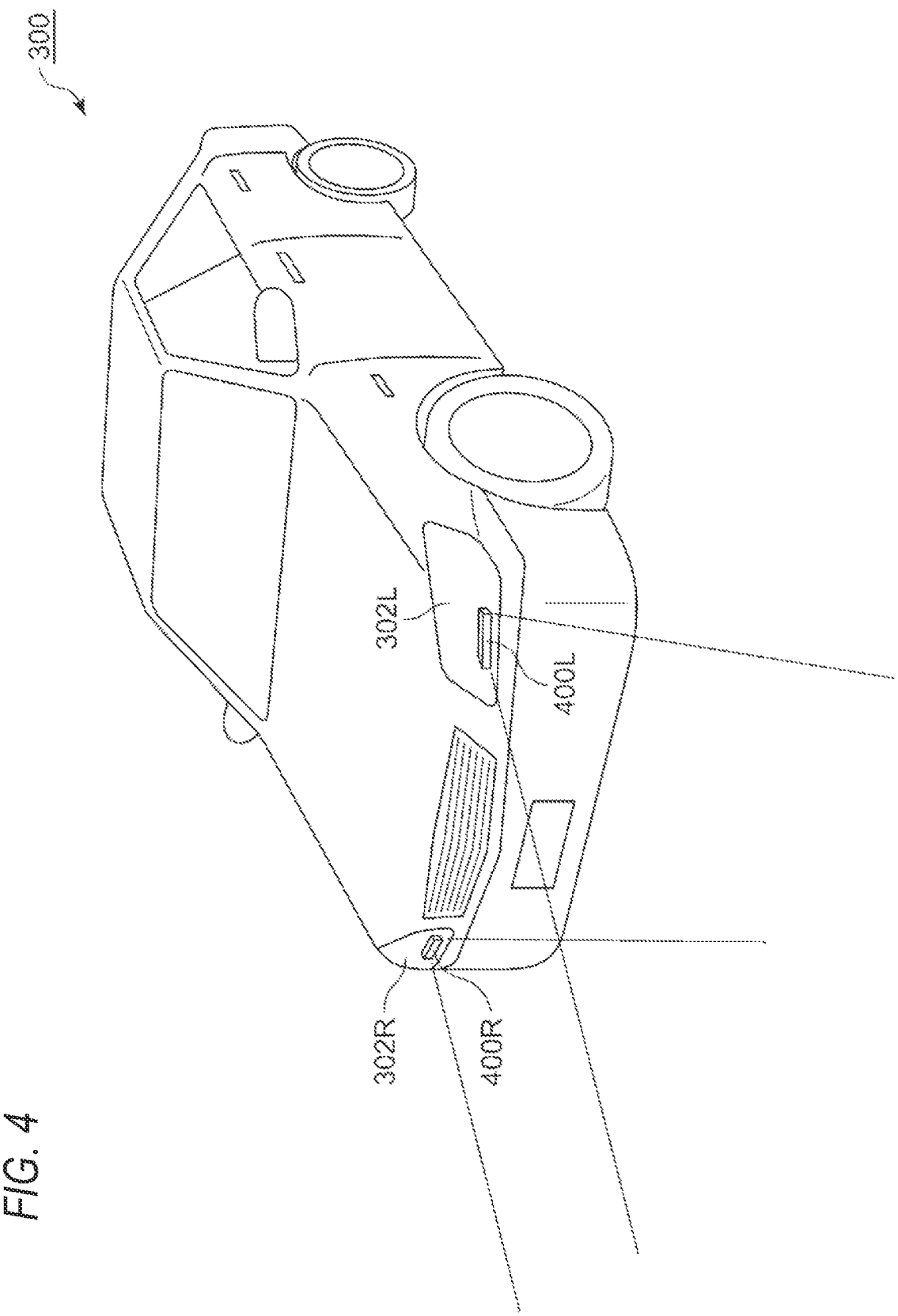
FIG. 4 is a perspective view of an automobile including the gating camera.

Next, a configuration of the illumination device 22 will be described. FIG. 4 is a perspective view of an automobile 300 including the gating camera 20. The automobile 300 includes left and right headlamps 302L and 302R. In the present embodiment, the illumination device 22 of the gating camera 20 is divided into illumination units 400L and 400R respectively built in the left and right headlamps 302L and 302R, and emitted light from the illumination units 400L and 400R are combined to form an illumination light distribution.

Figure 5:
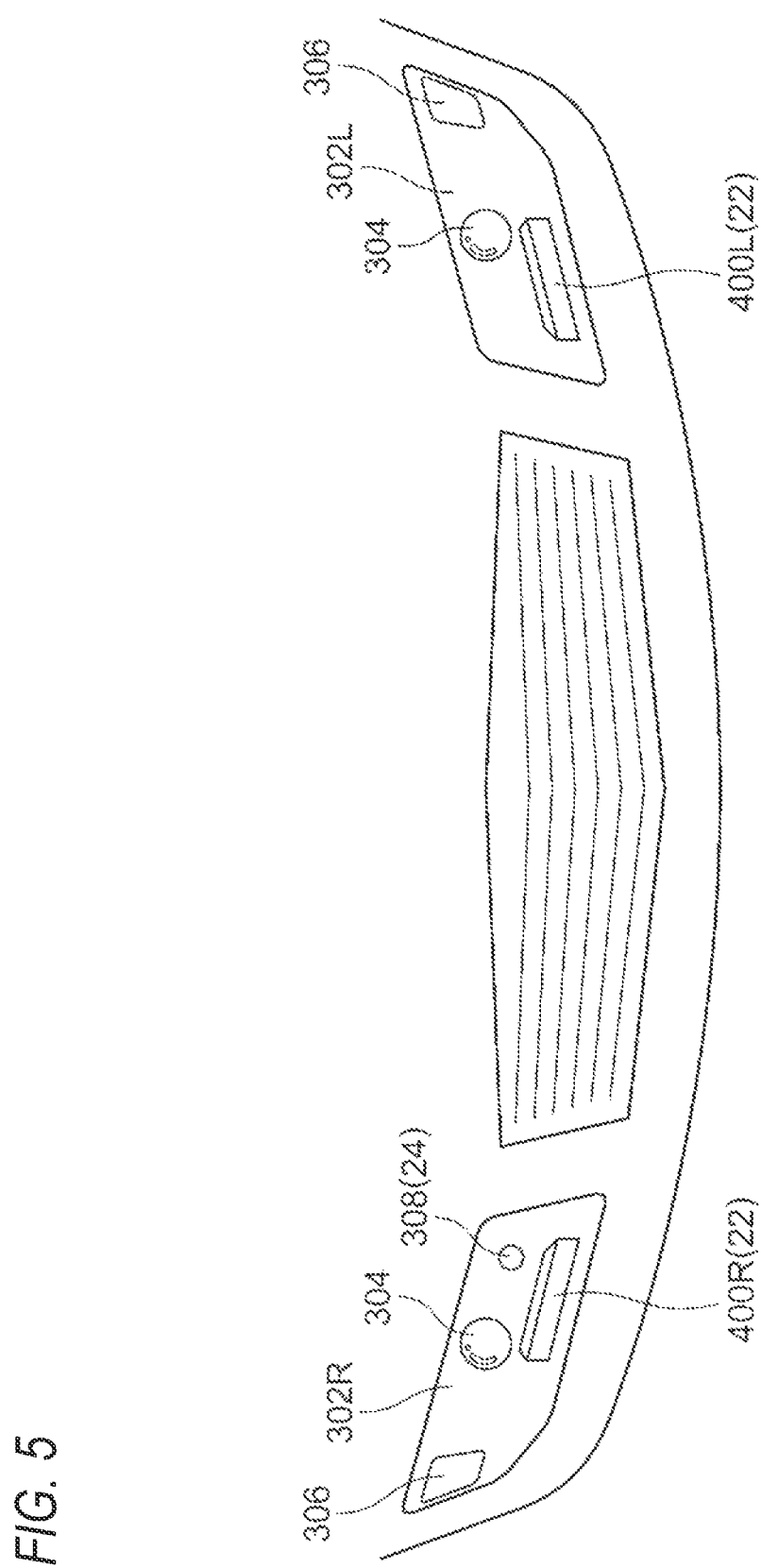
FIG. 5 is a diagram showing a configuration of a headlamp.

FIG. 5 is a diagram showing a configuration of the headlamps 302L and 302R. High beam and low beam light sources 304, turn signal lamps 306, and illumination unit 400 # are built in the headlamps 302 # (#=L and R).

A camera unit 308 corresponding to the image sensor 24 of the gating camera 20 is disposed at a position where both a driving lane of a host vehicle and an oncoming lane can be seen. For example, the camera unit 308 is built into one of the headlamps 302L and 302R (headlamp 302R in this example). For vehicles used in left-hand traffic countries and regions, the camera unit 308 may be built into the right headlamp 302R, and for vehicles used in right-hand traffic countries and regions, the camera unit 308 may be built into the left headlamp 302L.

The camera unit 308 may be provided outside the headlamp 302. For example, the camera unit 308 may be disposed inside a passenger compartment, for example, at a rearview mirror, or outside the passenger compartment, for example, at a front grill (radiator grill).

Figure 6:
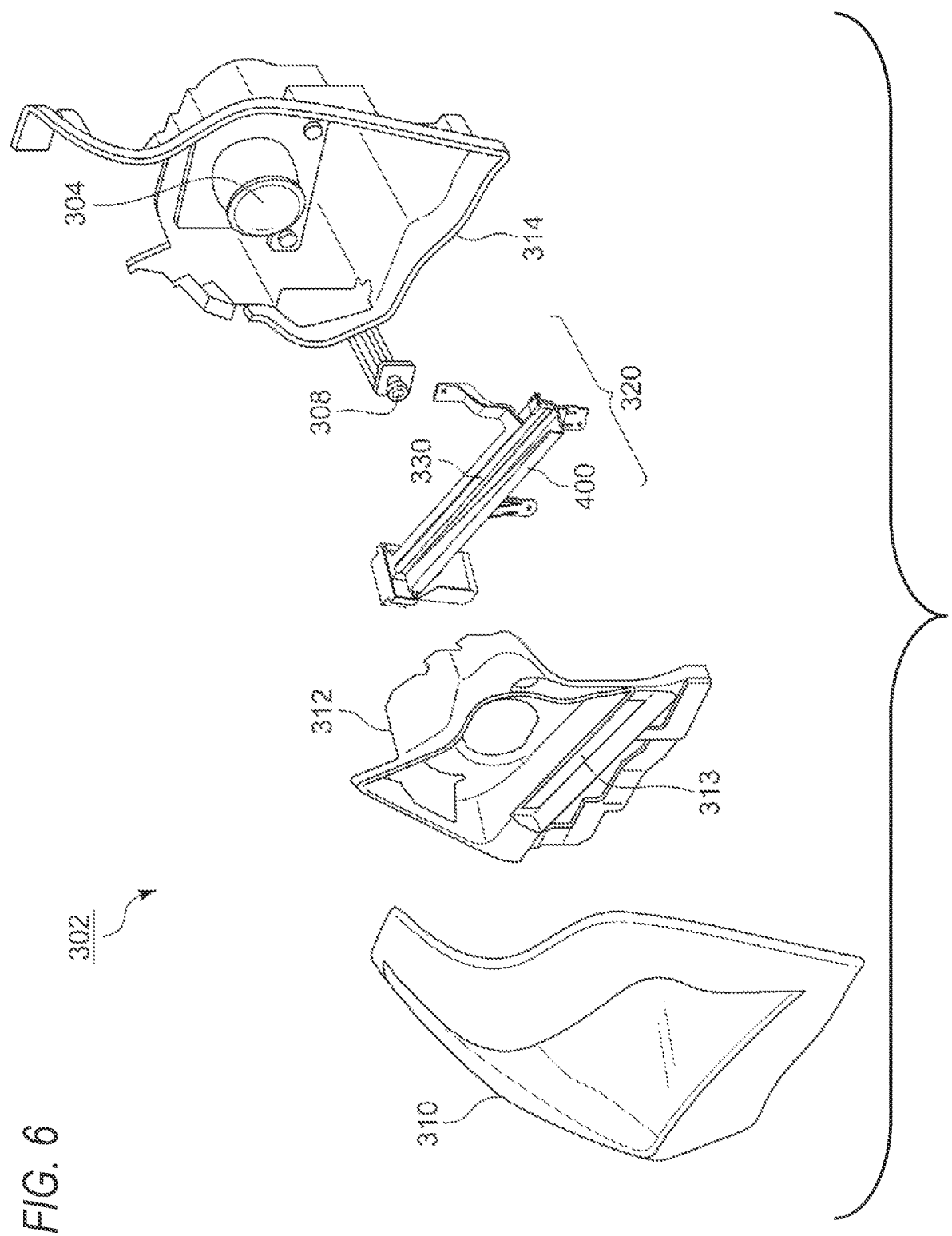
FIG. 6 is an exploded perspective view of the headlamp according to the first embodiment.

FIG. 6 is an exploded perspective view of the headlamp 302. The headlamp 302 includes the high beam and low beam light source 304, the camera unit 308, an outer lens 310, an extension 312, a lamp body 314, and a lamp unit 320. The lamp unit 320 is provided behind the extension 312. The extension 312 is provided with an opening 313 through which emitted light from the lamp unit 320 can pass.

The lamp unit 320 is modularized including a clearance lamp (front position lamp) 330 which is a white lamp and the illumination unit 400 of the gating camera.

Figure 7:
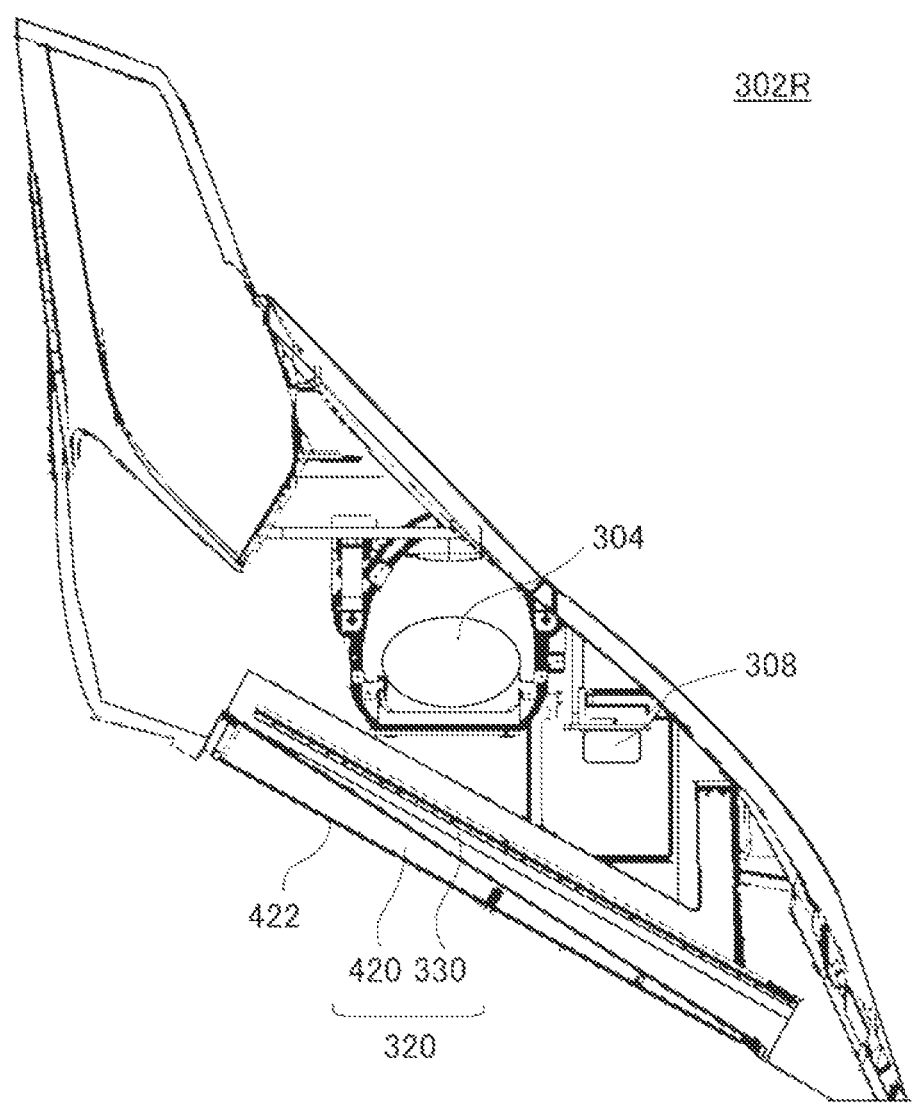
FIG. 7 is a plan view of the headlamp in FIG. 6.

FIG. 7 is a plan view of the headlamp 302R. In this example, an emission surface 422 of a photoconductor 420 follows a shape of the headlamp 302R, and the photoconductor 420 is disposed to be inclined with respect to a plane perpendicular to a traveling direction of the vehicle. A near-infrared light source 410 is disposed inside the headlamp 302 and outside the vehicle with an optical axis of the near-infrared light source 410 directed toward the center of the vehicle.

Figure 8:
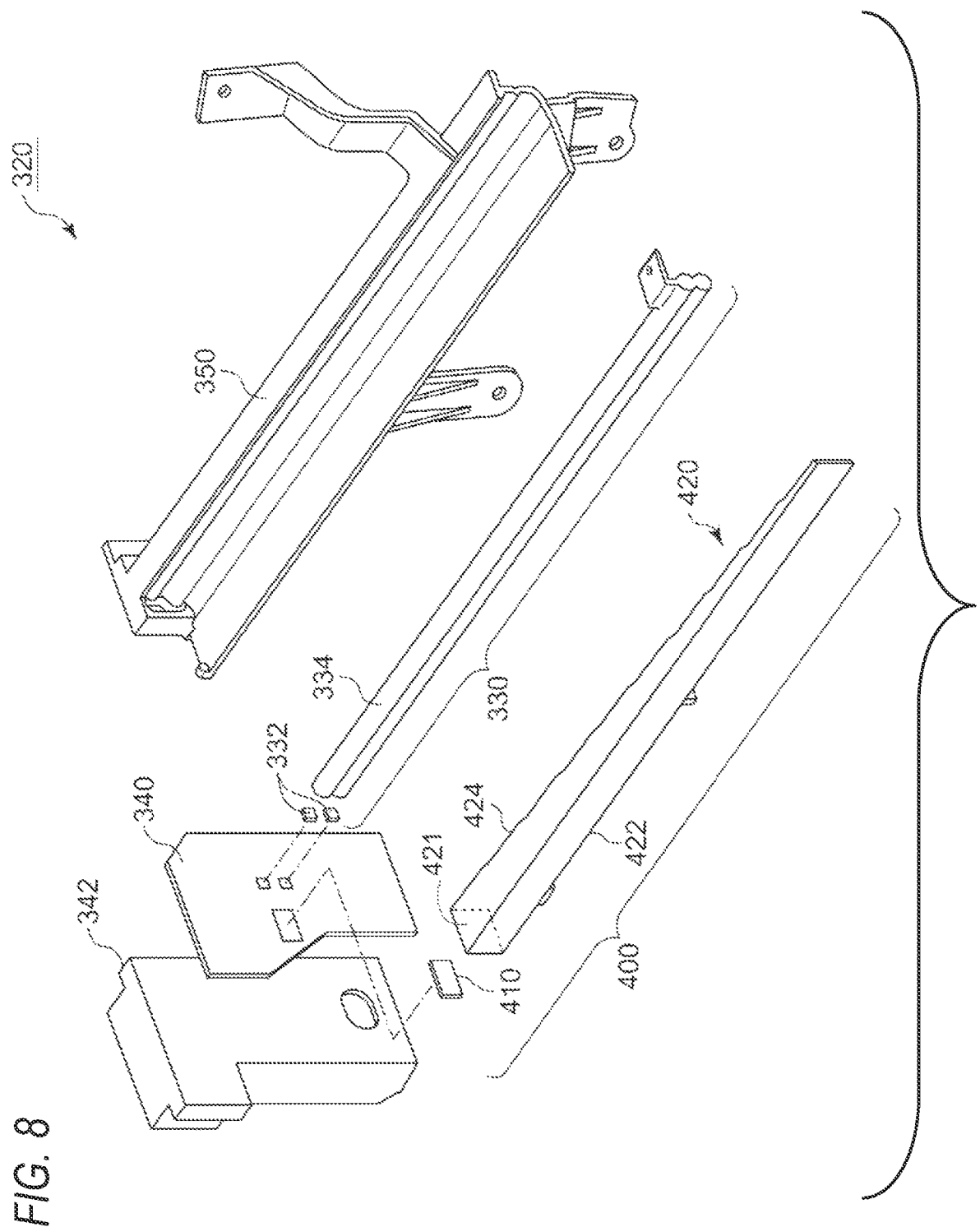
FIG. 8 is an exploded perspective view of a lamp unit.

FIG. 8 is an exploded perspective view of the lamp unit 320. The lamp unit 320 includes the illumination unit 400, the clearance lamp 330, a printed circuit board 340, a heat sink 342, and a base 350. The lamp unit 320 is for the right headlamp 302R, and the left headlamp 302L has a left-right reversed structure.

The illumination unit 400 includes the near-infrared light source 410 and the photoconductor 420. The near-infrared light source 410 is a near-infrared semiconductor laser (laser diode). The near-infrared light source 410 may be a high-output light emitting diode (LED). The photoconductor 420 receives a near-infrared beam, which is emitted light from the near-infrared light source 410, on a light entrance surface 421 of the photoconductor 420, and emits illumination light having a predetermined light distribution from the emission surface 422 to the front of the lamp.

The clearance lamp 330 includes a white light source 332 and a photoconductor 334. The white light source 332 is a white light emitting diode (LED). The photoconductor 334 receives emitted light from the white light source 332 on an end surface of the photoconductor 334. The white light is reflected inside the photoconductor 334 and emitted to the front of the lamp.

The photoconductor 420 of the illumination unit 400 has a rear surface 424 facing the emission surface 422. The photoconductor 420 is disposed such that the rear surface 424 faces a surface 336 of the photoconductor 334, which is a light emitting surface of the clearance lamp 330. The photoconductor 420 emits, from the emission surface 422 to in front of the vehicle, the emitted light from the clearance lamp 330 which is received by the rear surface 424 of the photoconductor 420.

In this configuration, the near-infrared light source 410 and the white light source 332 are mounted on the common printed circuit board 340. The heat sink 342 is attached to the printed circuit board 340.

Figure 9B:
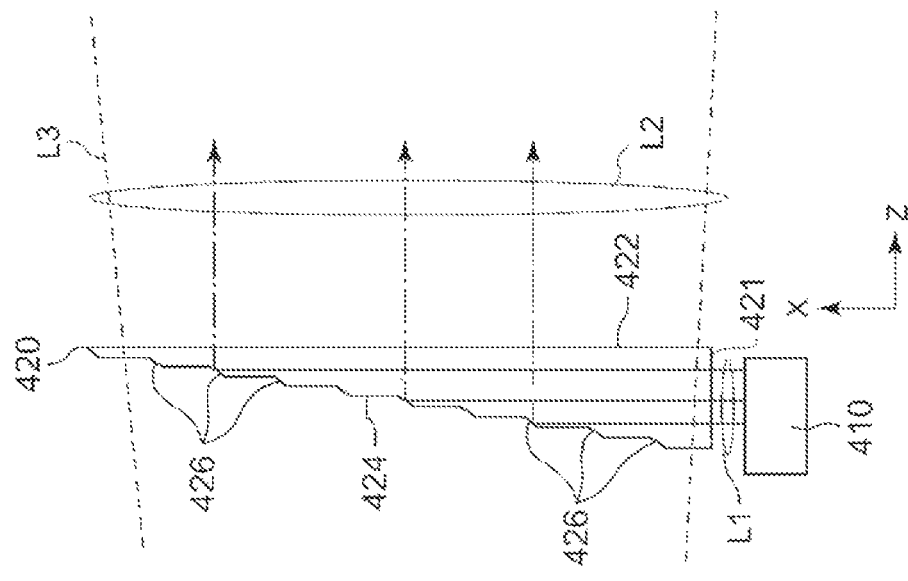
FIG. 9B is a plan view of the illumination unit.
Figure 9A:
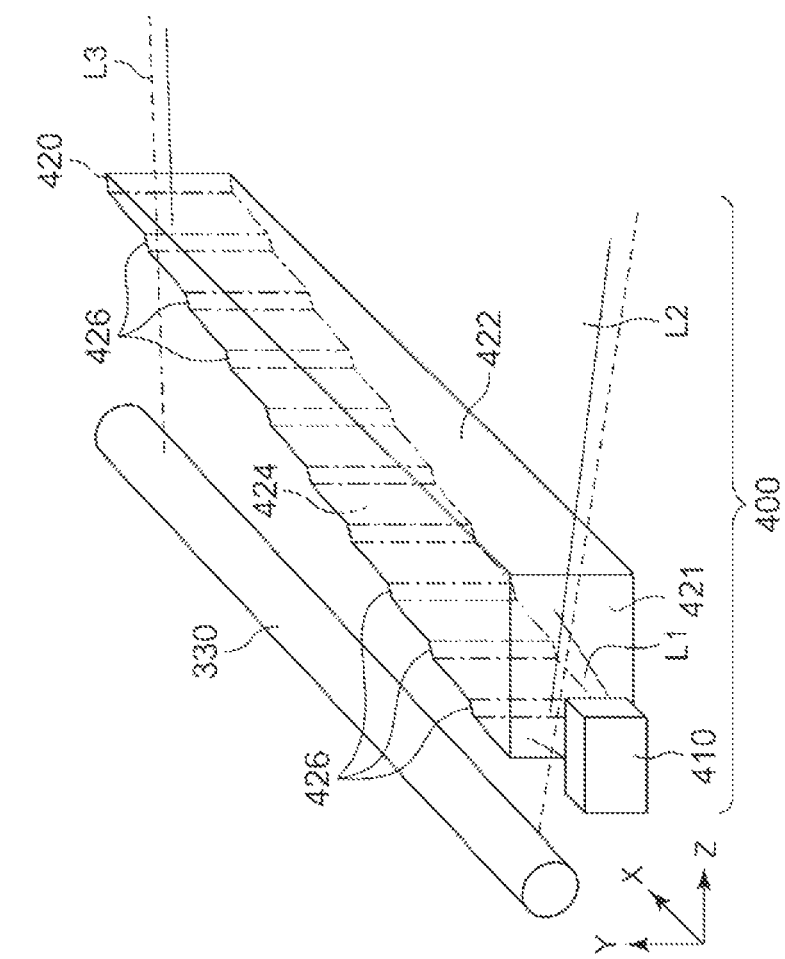
FIG. 9A is a perspective view of an illumination unit.

FIG. 9A is a perspective view of the illumination unit 400, and FIG. 9B is a plan view of the illumination unit 400.

A plurality of steps 426 which are spaced apart in an optical axis direction of the near-infrared light source 410 are provided on the rear surface 424 of the photoconductor 420, and the steps 426 are formed to be inclined with respect to the optical axis. A tilt angle of each step 426 is designed such that light reflected from a surface of the step 426 is directed in the traveling direction of the vehicle. The steps 426 may be vapor deposited with a metal such as aluminum to enhance reflectance. Portions, other than the steps 426, of the rear surface 424 are substantially parallel to the optical axis. Emitted light L1 from the near-infrared light source 410 propagates inside the photoconductor 420 in the optical axis direction (X direction in the drawing), is reflected at the steps 426 on the rear surface 424, and is emitted from the emission surface 422 in the front direction (Z direction) of the lamp. In FIG. 9B, representative light of the infrared light beam emitted from the near-infrared light source 410 is indicated by dashed-dotted lines. In FIG. 9B, emitted light L3 from the clearance lamp 330 behind the photoconductor 420 is indicated by a dashed line.

The above is the configuration of the headlamp 302. According to the headlamp 302, the optical system of the illumination device of the gating camera is implemented by the photoconductor 420, so that when a case where a lens optical system or a reflective optical system is used is compared, a degree of freedom in a shape and a size of the illumination unit 400 is increased, and it becomes possible to accommodate the illumination unit 400 in a housing of the headlamp without impairing functions of existing lamps.

When white light is transmitted through the photoconductor, the photoconductor itself glows white and is visually recognized due to internal reflection and diffusion. Therefore, in the related art, the photoconductor is sometimes used as a clearance lamp, but the photoconductor is difficult to be employed in a lamp intended to irradiate an object, such as a low beam and a high beam. In this regard, in the present embodiment, by setting illumination light for the active sensor as the infrared light, even if the photoconductor is employed in an optical system for forming an illumination light distribution, the light will not be visually recognized as white light.

In addition, according to the headlamp 302, by disposing the clearance lamp 330 behind the illumination unit 400 that generates the near-infrared illumination light, near-infrared spectral components contained in the illumination light overlap the white light emitted by the clearance lamp 330, so that a red color can be prevented from being visually recognized.

A light distribution is formed by using the reflection from the plurality of steps 426 provided on the photoconductor 420, so that a widened light distribution in the horizontal direction can be formed and the entire field of view in the horizontal direction of the image sensor can be covered.

FIGS. 10A and 10B are diagrams showing simulation results of a light distribution pattern of the illumination unit 400 according to the first embodiment. FIG. 10A shows a luminous intensity distribution on a virtual vertical screen, and FIG. 10B shows a luminous intensity distribution in the vertical direction. In this configuration, a range of ±10° in the horizontal direction and ±7° in the vertical direction is a half width of the illumination light.

Figure 11A:
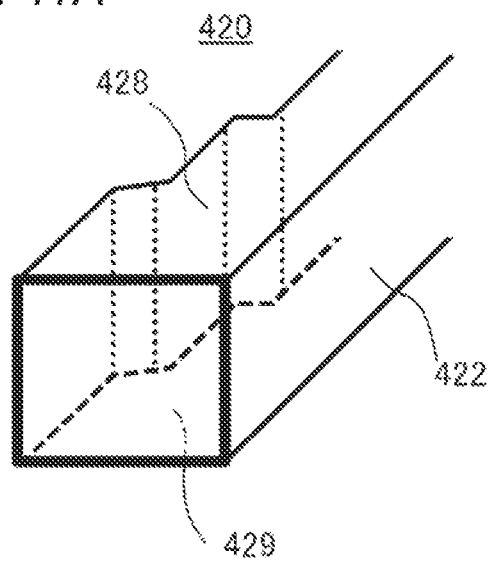
FIGS. 11A and 11B are diagrams illustrating causes of a plurality of peaks in a light distribution.
Figure 11B:
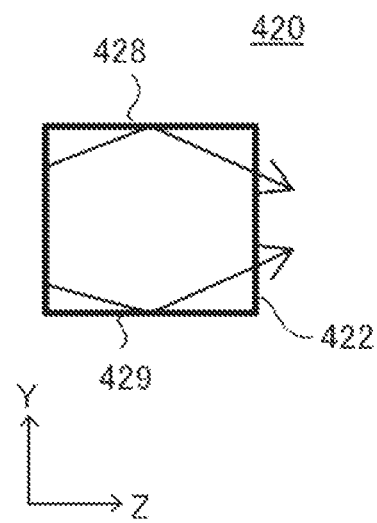

Referring to FIG. 10B, the light distribution shows two peaks in the vertical direction. FIGS. 11A and 11B are diagrams illustrating causes of a plurality of peaks in the light distribution. The inventors have recognized that one of the causes of the plurality of peaks is reflection at a top surface and a bottom surface in the photoconductor 420. Some modifications for improving the luminous intensity distribution in the vertical direction are described below.

First Modification

Figure 12A:
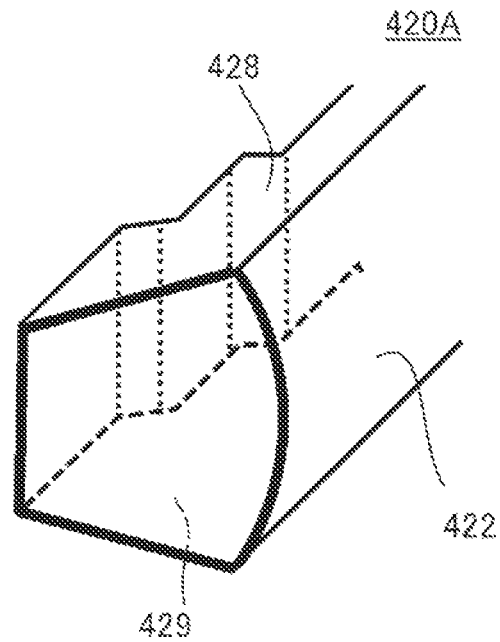
FIGS. 12A and 12B are diagrams showing a photoconductor according to a first modification.
Figure 12B:
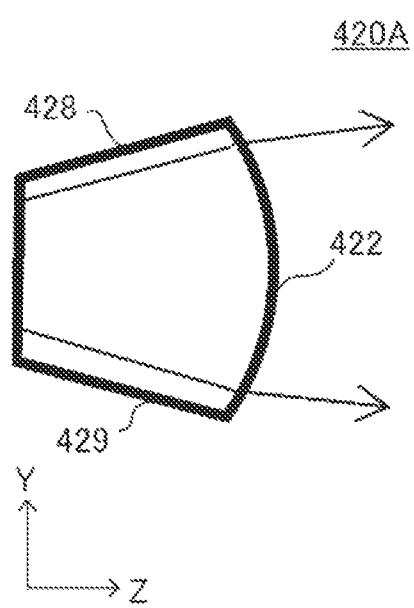

FIGS. 12A and 12B are diagrams showing a photoconductor 420A according to a first modification. In the first modification, a sagittal plane (Y-Z cross section) of the photoconductor 420A is tapered inversely toward the front of the vehicle, and a distance between a top surface 428 and a bottom surface 429 increases toward the front of the vehicle (Feature 1). The emission surface 422 of the photoconductor 420A has a curvature in the vertical direction (Feature 2). In this example, the emission surface 422 has a positive curvature.

FIG. 12B shows an optical path in the photoconductor 420A. By providing the reverse taper, reflection on the top surface 428 and the bottom surface 429 of the photoconductor 420A is prevented. When a taper angle of the photoconductor 420A is greater than a spread angle in the vertical direction of the infrared light beam, the reflection at the top surface 428 and the bottom surface 429 can theoretically be eliminated. The present invention is not limited to this, and the taper angle may be smaller than the spread angle of the beam, and in this case, an effect of preventing the occurrence of the plurality of peaks can also be obtained.

According to the first modification, the spread angle in the vertical direction of the emitted illumination light, that is, an irradiation range can be controlled according to the curvature of the emission surface 422 of the photoconductor 420A.

FIG. 13A and FIG. 13B are diagrams showing a simulation result of a light distribution pattern when using the photoconductor according to the first modification. FIG. 13A shows a luminous intensity distribution on a virtual vertical screen, and FIG. 13B shows a luminous intensity distribution in the vertical direction. As shown in FIG. 13B, according to the first modification, the luminous intensity distribution in the vertical direction can be made into a single peak. This is an effect of the reverse taper of the photoconductor 420A.

In addition, in the first modification, the irradiation range in the vertical direction is ±4°. This is an effect of giving the emission surface 422 a curvature (R=300 mm).

Second Modification

Figure 14A:
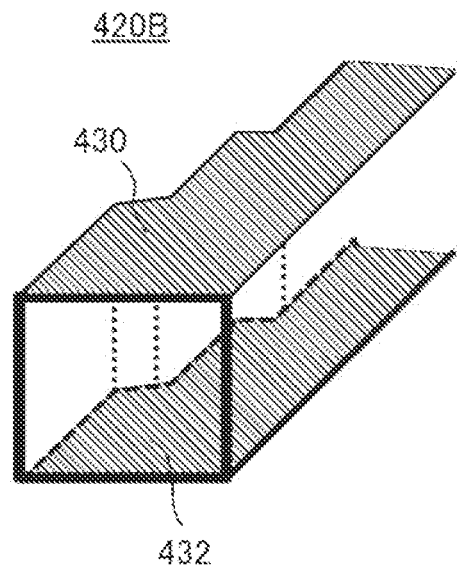
FIGS. 14A and 14B are diagrams showing a photoconductor according to a second modification.
Figure 14B:
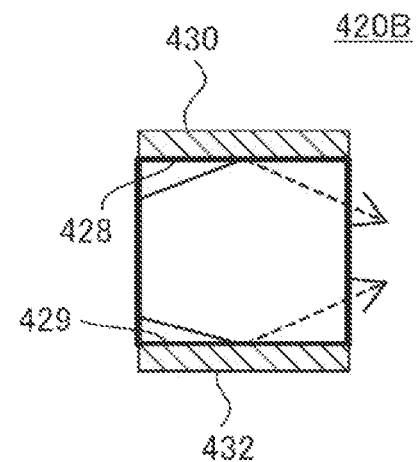

FIGS. 14A and 14B are diagrams showing a photoconductor 420B according to a second modification. In this modification, absorbers 430 and 432 are attached to at least one (both in this example) of the top surface 428 and the bottom surface 429 of the photoconductor 420B (Feature 3). An absorption rate of the absorbers 430 and 432 is preferably as high as possible, preferably 90% or more. The absorbers 430 and 432 are materials that absorb a wavelength band of the near-infrared beam, and a type of the absorbers is not limited.

Figure 15:
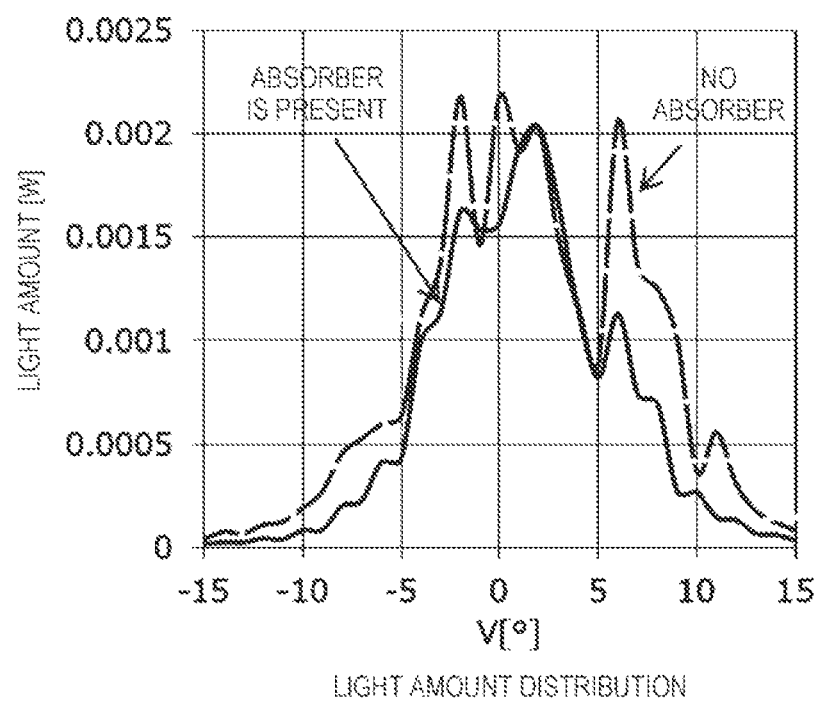
FIG. 15 is a diagram showing a simulation result of a light amount distribution in a vertical direction in the second modification.

FIG. 15 is a diagram showing a simulation result of a light amount distribution in a vertical direction in the second modification. For comparison, the light amount distribution without an absorber is shown. In a case of no absorber, the distribution is divided into three peaks, whereas the absorber is attached, so that the reflected light from the top surface 428 and the bottom surface 429 of the photoconductor 420B can be reduced, and the occurrence of the plurality of peaks can be prevented.

Third Modification

Figure 16A:
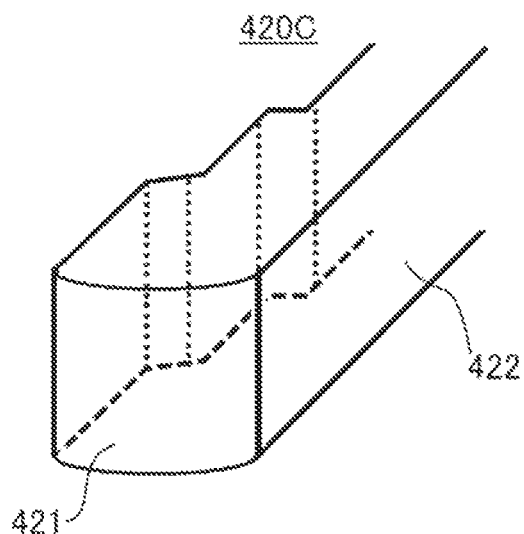
FIGS. 16A and 16B are diagrams showing a photoconductor according to a third modification.
Figure 16B:
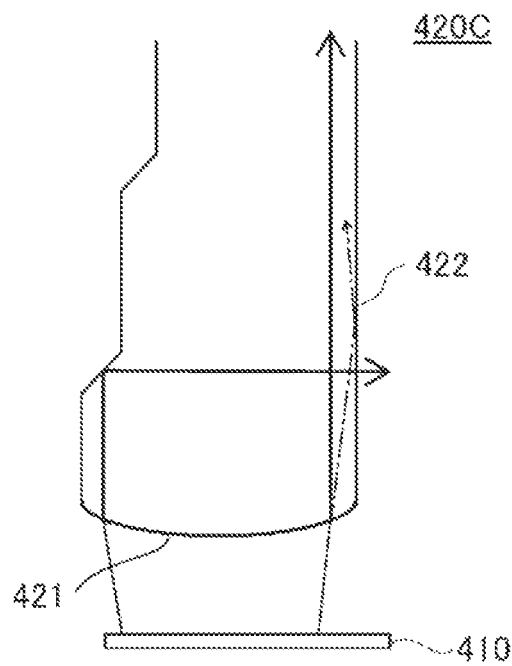

FIGS. 16A and 16B are diagrams showing a photoconductor 420C according to a third modification. In this modification, the light entrance surface 421 of the photoconductor 420C has a curvature in the horizontal direction (Feature 4). In this example, the light entrance surface 421 is a convex surface, and makes an emitted beam having a spread angle close to parallel light.

As indicated by a dashed-dotted line, when a spread infrared light beam is guided inside the photoconductor 420, the infrared light beam is totally reflected at the emission surface 422, which causes a decrease in efficiency, stray light, and ghost. On the other hand, by making the infrared light beam close to the parallel light, a total reflection on the emission surface 422 can be prevented, a decrease in efficiency can be prevented, or the stray light and the ghost can be prevented.

Alternatively, according to the curvature of the light entrance surface 421, the light distribution in the horizontal direction of the illumination light emitted from the emission surface 422 of the photoconductor 420C can be controlled.

Fourth Modification

Figure 17:
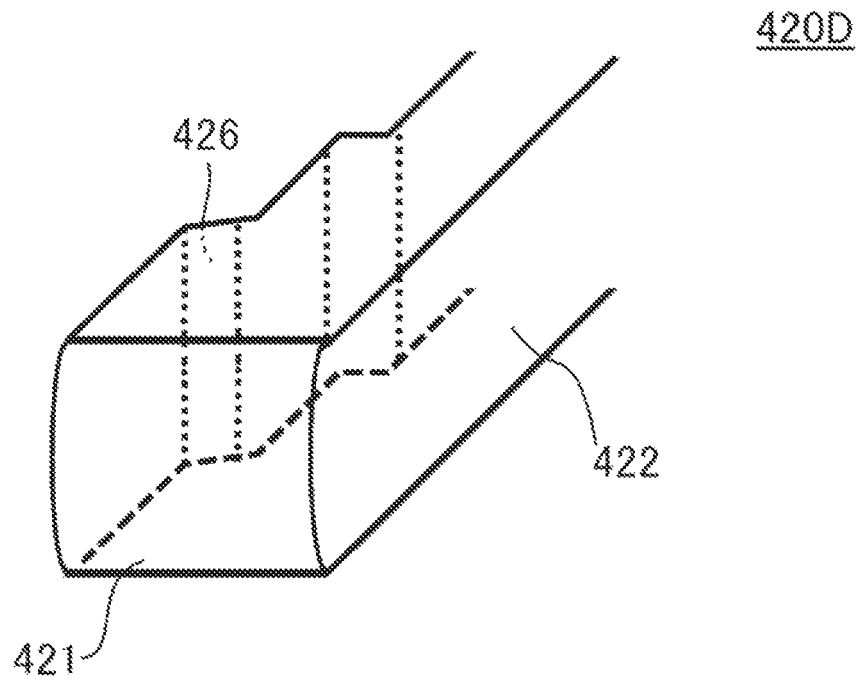
FIG. 17 is a diagram showing a photoconductor according to a fourth modification.

FIG. 17 is a diagram showing a photoconductor 420D according to a fourth modification. In this modification, the light entrance surface 421 of the photoconductor 420D has a curvature in the vertical direction (Feature 5). In this example, the light entrance surface 421 is a convex surface, and makes an emitted beam having a spread angle close to parallel light.

Accordingly, the light distribution in the vertical direction of the illumination light emitted from the emission surface 422 of the photoconductor 420D can be controlled according to the curvature of the light entrance surface. Since the spread in the horizontal direction of the infrared light after reflection at the steps 426 is prevented, incident on the top surface and the bottom surface of the photoconductor can be prevented.

Features 1 to 5 described in the first to fourth modifications can be combined freely.

The present invention has been described above based on the embodiments. The embodiments are intended to be illustrative only, and it will be obvious to those skilled in the art that various modifications can be made by combining components and processes in the embodiments and that such modifications are also within the scope of the present invention. Hereinafter, such modifications will be described.

In the embodiments, an illumination device for a gating camera has been described, but application of the present invention is not limited thereto, and the present invention can be applied to an illumination device for various active sensors.

In the embodiment, the photoconductor of the illumination unit 400 is disposed in front of the clearance lamp 330, but the type of the white light source is not limited to the clearance lamp 330, and the illumination unit may be disposed in front of a low beam lamp, an adaptive driving beam (ADB) lamp, or a daytime running lamp (DRL). If the photoconductor is not visually recognized as red, the illumination unit 400 can be disposed in a position independent of the white light source.

Figure 18A:
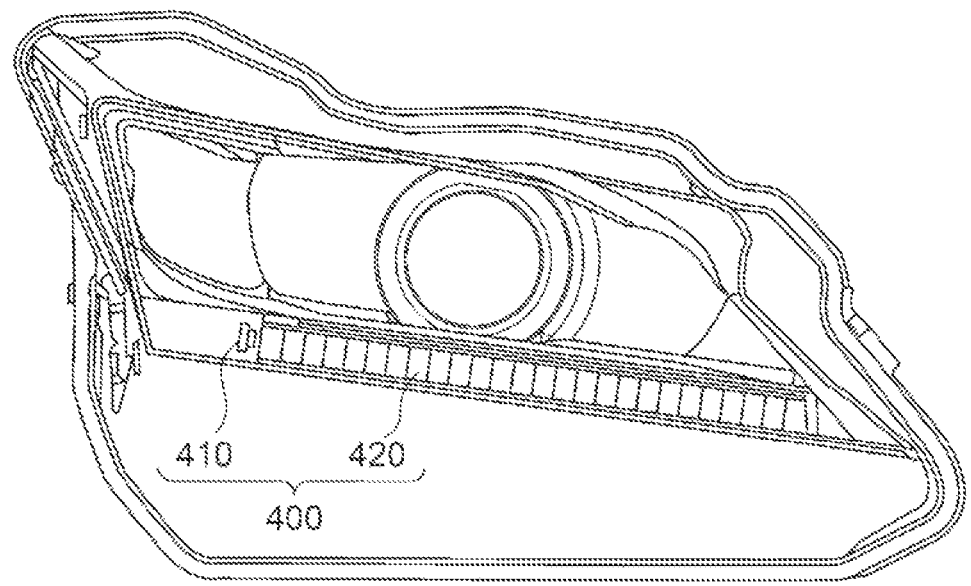
FIGS. 18A and 18B are front views schematically showing a layout of the illumination unit.
Figure 18B:
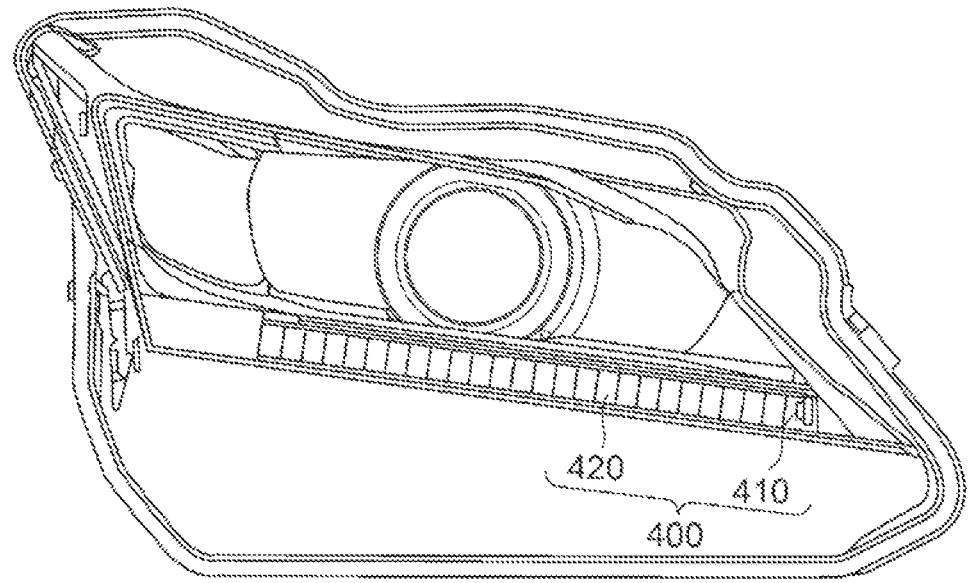

FIGS. 18A and 18B are front views schematically showing a layout of the illumination unit 400. In FIG. 18A, the near-infrared light source 410 is disposed inside the headlamp 302 and outside the vehicle with the optical axis of the near-infrared light source 410 directed toward the center of the vehicle. In FIG. 18B, the near-infrared light source 410 is disposed inside the headlamp 302 and at the center side of the vehicle with the optical axis of the near-infrared light source 410 directed outward the vehicle.

Second Embodiment

In a second embodiment, another configuration of the illumination unit will be described.

The illumination unit 400 corresponds to the illumination device 22 in FIG. 1. In the first embodiment, the illumination light emitted by the illumination unit 400 is near-infrared light or mid-infrared light, and in the second embodiment, the illumination light may be visible light having a predetermined wavelength.

FIG. 19 is an exploded perspective view of the headlamp 302 according to the second embodiment. The headlamp 302 includes the high beam and low beam light source 304, the camera unit 308, the outer lens 310, the extension 312, the lamp body 314, and the illumination unit 400. The illumination unit 400 is provided behind the extension 312. The extension 312 is provided with the opening 313 through which the emitted light from the illumination unit 400 can pass. Although the position of illumination unit 400 is not particularly limited, the illumination unit 400 may be provided below the headlamp 302, for example.

Figure 20:
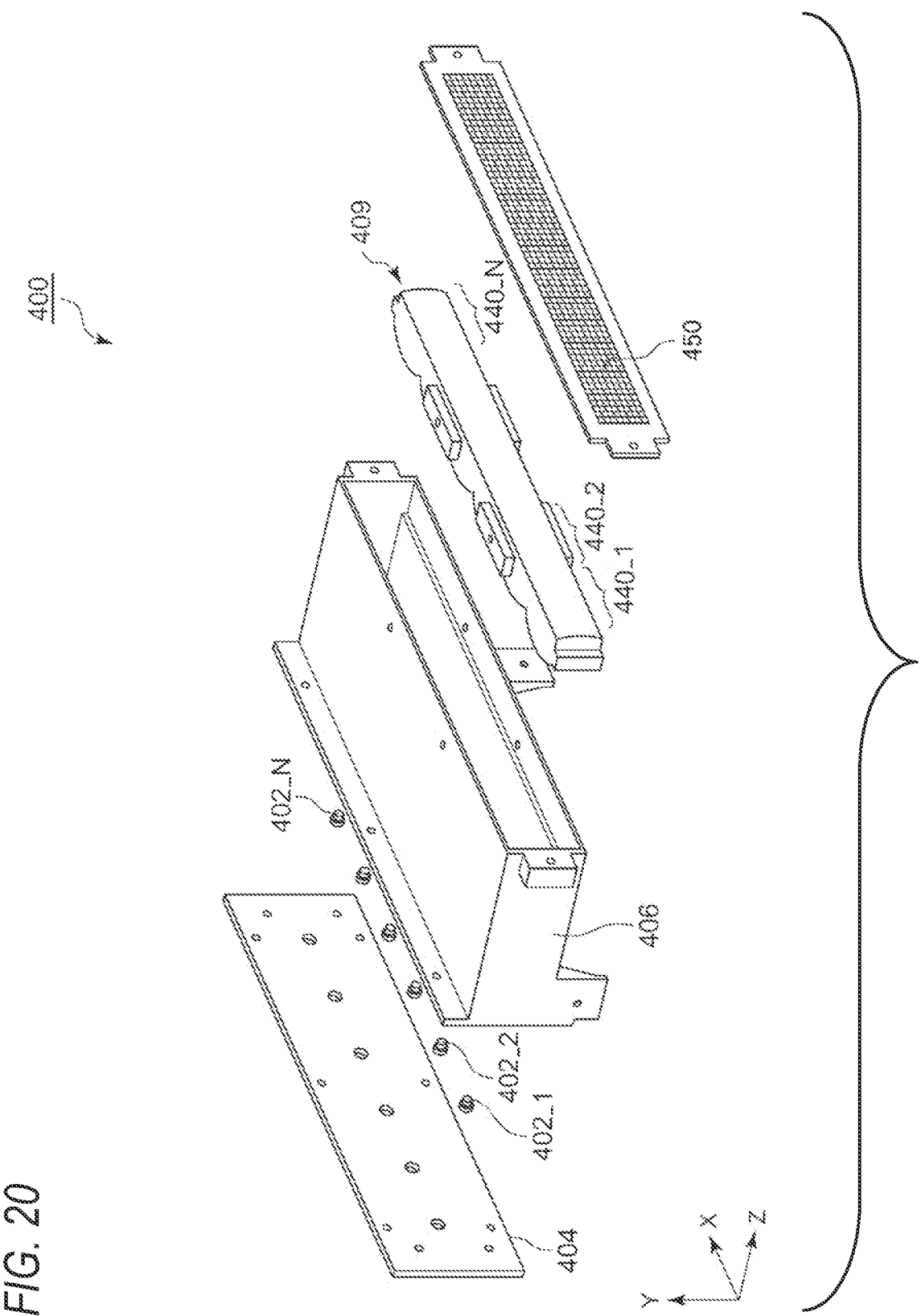
FIG. 20 is an exploded perspective view of the illumination unit in FIG. 19.

FIG. 20 is an exploded perspective view of the illumination unit 400. The illumination unit 400 includes a plurality of laser diodes 402_1 to 402_N, a heat sink 404, a housing 406, a plurality of condensing lenses 440_1 to 440_N, and a fly-eye lens 450. In this example, N=6.

The plurality of laser diodes 402_1 to 402_N may be disposed side by side in the horizontal direction (in FIG. 20, X direction). The laser diodes 402 radiate emitted beams with a spread angle.

The heat sink 404 supports the plurality of laser diodes 402 from a back side. The heat sink 404 and the laser diodes 402 are thermally coupled, and heat from the laser diodes 402 is diffused and radiated through the heat sink 404.

The plurality of condensing lenses 440_1 to 440_N are provided corresponding to the plurality of laser diodes 402_1 to 402_N. Each condensing lens 440_i ($1 \leq i \leq N$) is provided on the optical path of the emitted beam of the corresponding one 402_i of the plurality of laser diodes, and emits the emitted beam close to parallel light.

Each condensing lens 440 has different focal lengths in the horizontal direction (X direction) and the vertical direction (Y direction). The plurality of condensing lenses 440_1 to 440_N are integrally formed as one lens unit 409.

Figure 21A:
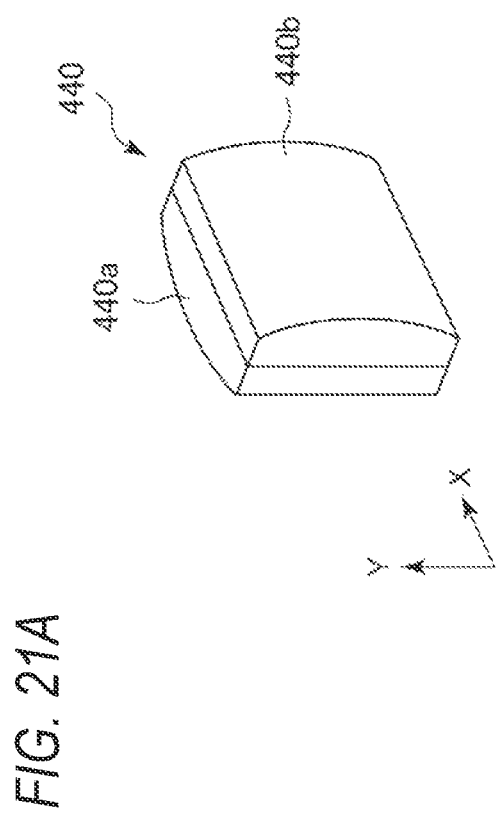
FIG. 21A is a diagram showing a configuration example of a condensing lens.

FIG. 21A is a diagram showing a configuration example of the condensing lens 440. The condensing lens 440 is configured by bonding two cylindrical lenses 440a and 440b having orthogonal power directions. A power direction of the cylindrical lens 440a on a side of the laser diode 402, which is the light source, is the horizontal direction (X direction), and a power direction of the cylindrical lens 440b on a side of the emission surface is the vertical direction (Y direction).

Figure 21B:
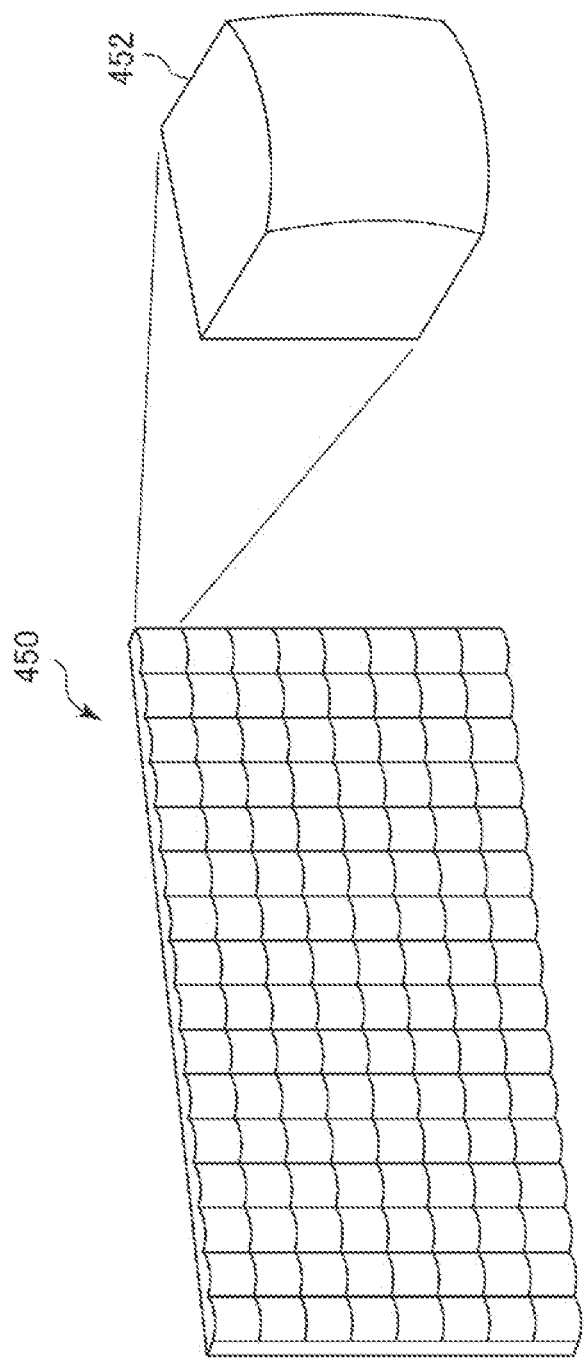
FIG. 21B is a perspective view of a fly-eye lens.

Reference is made back to FIG. 20. The fly-eye lens 450 diffuses the emitted light from the plurality of condensing lenses 440_1 to 440_N. FIG. 21B is a perspective view of the fly-eye lens 450. The fly-eye lens 450 is also referred to as a diffuse illumination element, and is an imaging element in which the same single lenses 452 are arranged in a matrix.

Figure 22A:
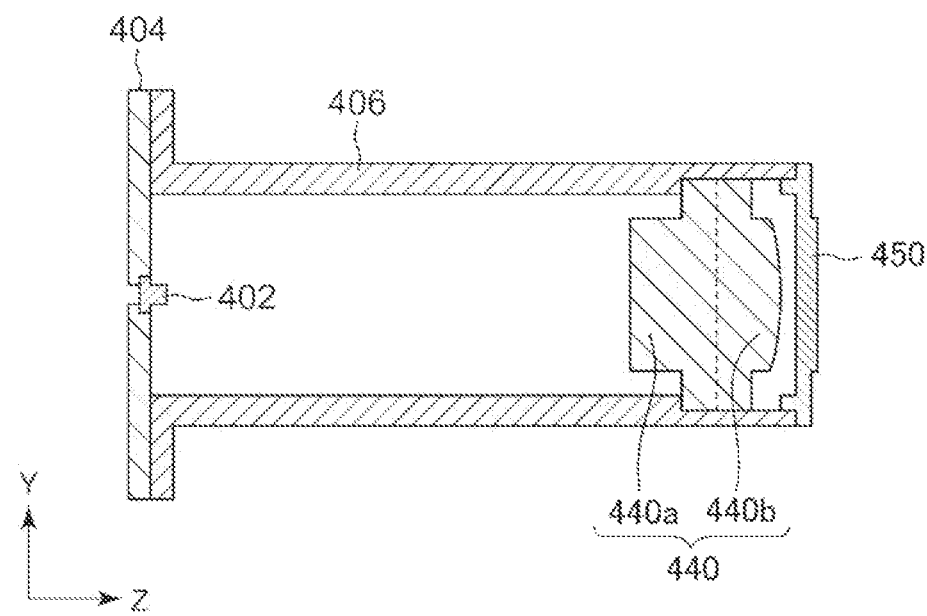
FIG. 22A is a cross-sectional view of the illumination unit.
Figure 22B:
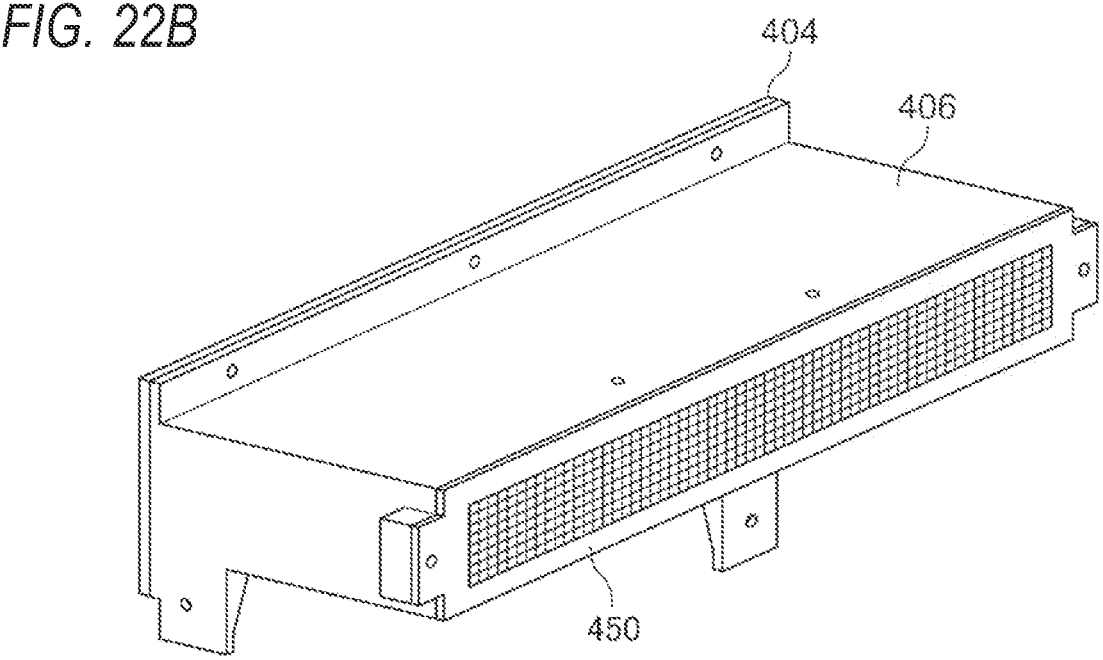
FIG. 22B is an external perspective view of the illumination unit.

FIG. 22A is a cross-sectional view of the illumination unit 400, and FIG. 22B is an external perspective view of the illumination unit 400.

The housing 406 has two openings facing each other, the heat sink 404 is fixed to a side of one opening, and the lens unit 409 and the fly-eye lens 450 are fixed to a side of the other opening.

Figure 23A:
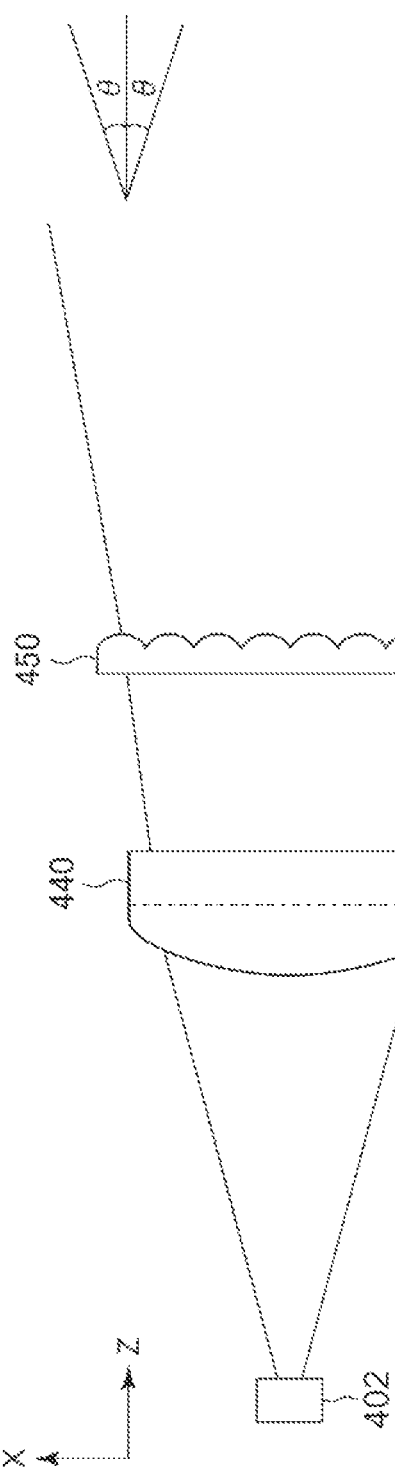
FIGS. 23A and 23B are diagrams of optical beams of the illumination unit.
Figure 23B:
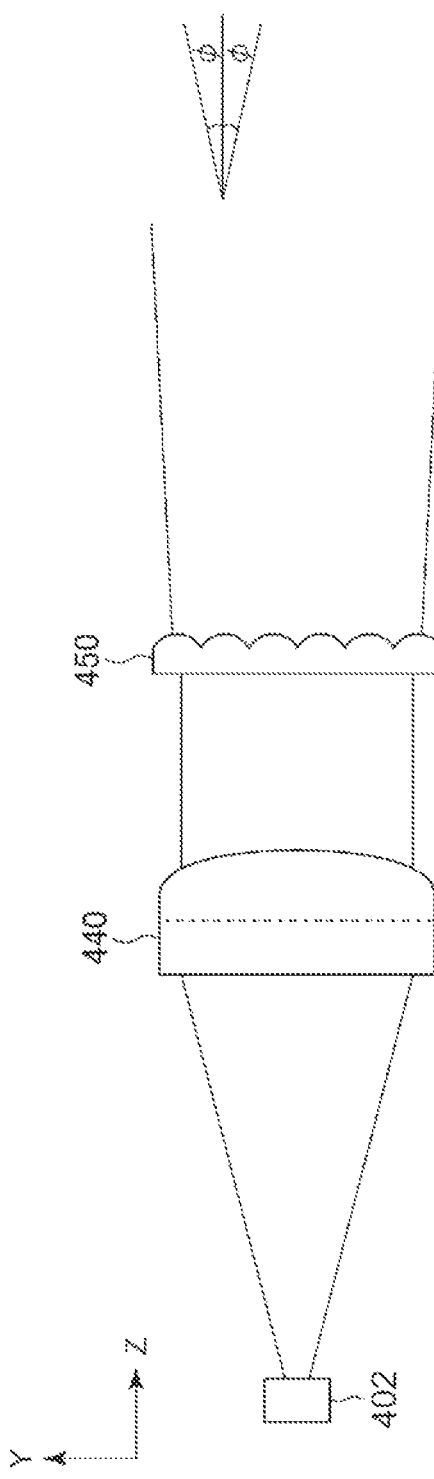

The above is the configuration of the illumination unit 400. Next, an operation thereof will be described. FIGS. 23A and 23B are diagrams of optical beams of the illumination unit 400. FIG. 23A is the diagram of the optical beams in an X-Z plane, and FIG. 23B is the diagram of the optical beams in a Y-Z plane. As shown in FIG. 23A, the condensing lens 440 has a first power with respect to the horizontal direction, and the emitted beams from the laser diode 402 are brought close to the parallel light with respect to the horizontal direction. The emitted light from the fly-eye lens 450 is radiated in an angular range of ±θ(°) with respect to the horizontal direction.

As shown in FIG. 23B, the condensing lens 440 has a second power with respect to the vertical direction, and the emitted beams from the laser diode 402 are brought close to the parallel light with respect to the vertical direction. The emitted light from the fly-eye lens 450 is radiated in an angular range of ±φ with respect to the vertical direction.

The spread angle θ in the horizontal direction can be designed using, as parameters, the first power (focal length) of the condensing lens 440, a distance between the laser diode 402 and the condensing lens 440, and a power (focal length) of a single lens 452 constituting the fly-eye lens 450. Similarly, the spread angle φ in the vertical direction can be designed using, as parameters, the second power of the condensing lens 440, the distance between the laser diode 402 and the condensing lens 440, and the power (focal length) of the single lens 452 constituting the fly-eye lens 450.

Figure 24:
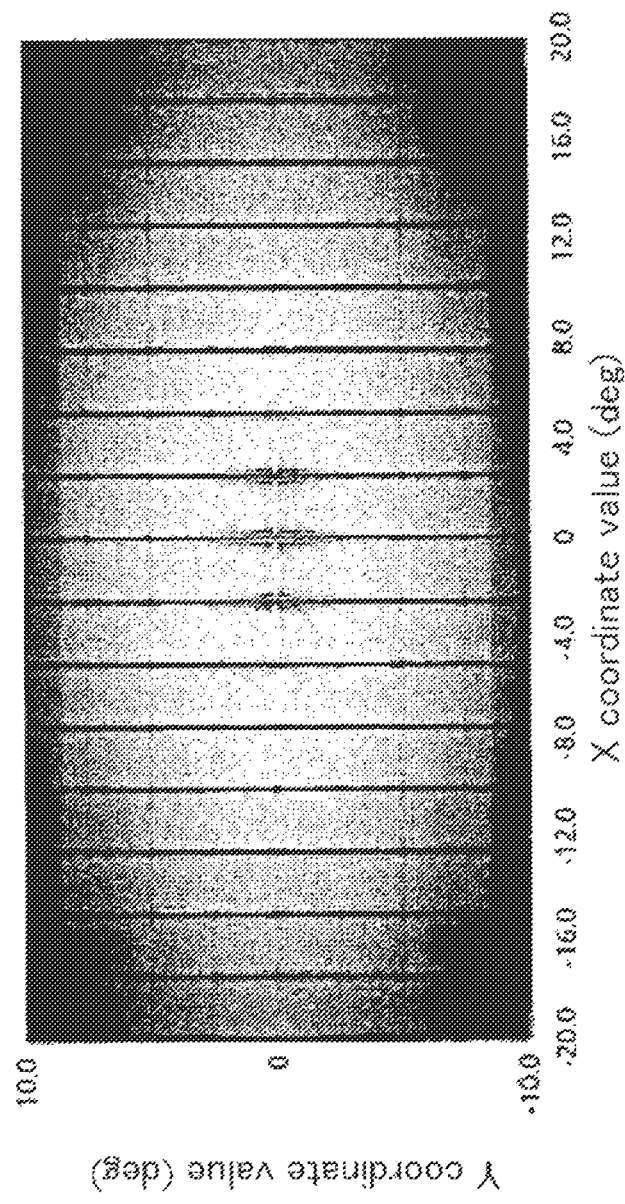
FIG. 24 is a diagram showing a luminance distribution (simulation result) of an emitted beam from the illumination unit.

FIG. 24 is a diagram showing a luminance distribution (simulation result) of the emitted beam from the illumination unit 400. In this example, a light distribution of θ=±17° in the horizontal direction and φ=±100 in the vertical direction is formed.

According to the illumination unit 400, the appropriate light distribution can be formed by combining the condensing lens and the fly-eye lens. In addition, a portion whose luminance is high can be locally eliminated within the light emitting surface, and laser safety standards can be satisfied. Specifically, the illumination unit 400 is classified as a laser class 1, and is required to have a ratio (AE/AEL) of an exposure radiation dose (AE) to an exposure radiation limit (AEL) of less than 1, and according to the present embodiment, the laser safety standards of the laser class 1 can be satisfied.

Although the present invention has been described using specific words and phrases based on the embodiments, the embodiments merely show one aspect of principles and applications of the present invention, and many modifications and changes in arrangement can be made in the embodiments without departing from the spirit of the present invention defined in the claims.

INDUSTRIAL APPLICABILITY

The present disclosure can be used for an active sensor.

REFERENCE SIGNS LIST

S1: light emission timing signal
S2: exposure timing signal
10: sensing system
20: sating camera
22: illumination device
24: image sensor
26: camera controller
28: image processing device
300: automobile
302: headlamp
304: high beam and low beam light source
306: turn signal lamp
308: camera unit
310: outer lens
312: extension
314: lamp body
320: lamp unit
330: clearance lamp
332: white light source
334: photoconductor
340: printed circuit board
342: heat sink
350: base
400: illumination unit
402: laser diode
404: heat sink
406: housing
410: near-infrared light source
420: photoconductor
422: emission surface
424: rear surface
426: step
428: top surface
429: bottom surface
440: condensing lens
450: fly-eye lens
452: single lens

The invention claimed is:

1. A vehicle lamp, comprising:
a white lamp; and
an illumination device for an active sensor, wherein
the illumination device includes:
 a near-infrared light source; and
 a photoconductor configured to receive emitted light from the near-infrared light source and emit, from an emission surface, illumination light having a predetermined light distribution,
the photoconductor is disposed such that a rear surface thereof faces a light emitting surface of the white lamp, and emits, from the emission surface, the emitted light of the white lamp which is received at the rear surface; and
the rear surface of the photoconductor is provided with a plurality of steps spaced apart in an optical axis direction of the near-infrared light source.

2. The vehicle lamp according to claim 1, wherein the white lamp is a clearance lamp.

3. The vehicle lamp according to claim 1, wherein the white lamp includes:
   a white light source; and
   a photoconductor configured to guide white light of the white light source, and the white light source and the near-infrared light source are mounted on the same board.

4. The vehicle lamp according to claim 1, further comprising:
   the illumination device and an image sensor constituting a gating camera.

* * * * *